(12) United States Patent
Teramoto et al.

(10) Patent No.: US 8,792,180 B2
(45) Date of Patent: Jul. 29, 2014

(54) PRODUCTION METHOD OF WAFER LENS, INTERMEDIATE DIE, OPTICAL COMPONENT, MOLDING DIE, AND PRODUCTION METHOD OF MOLDING DIE

(75) Inventors: Tougo Teramoto, Wakayama (JP); Shigeru Hosoe, Hino (JP); Akira Sato, Hachioji (JP); Toshiyuki Imai, Hachioji (JP); Yuiti Fujii, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 299 days.

(21) Appl. No.: 13/377,390

(22) PCT Filed: Apr. 7, 2010

(86) PCT No.: PCT/JP2010/056306
§ 371 (c)(1),
(2), (4) Date: Dec. 9, 2011

(87) PCT Pub. No.: WO2010/143466
PCT Pub. Date: Dec. 16, 2010

(65) Prior Publication Data
US 2012/0075709 A1    Mar. 29, 2012

(30) Foreign Application Priority Data

Jun. 12, 2009 (JP) .................. 2009-141325
Aug. 12, 2009 (JP) .................. 2009-187099

(51) Int. Cl.
*G02B 3/00* (2006.01)
(52) U.S. Cl.
USPC ........................ 359/642; 264/1.32

(58) Field of Classification Search
USPC .......................................... 359/642
See application file for complete search history.

(56) References Cited

U.S. PATENT DOCUMENTS 6,436,265 B1    8/2002  Shimada et al.
2006/0259546 A1  11/2006  Rudmann et al.

FOREIGN PATENT DOCUMENTS

| JP | 57-609 | 1/1982 |
| JP | 2000-275405 | 10/2000 |
| JP | 2000275405 A * | 10/2000 |
| JP | 2001-201609 | 7/2001 |
| JP | 2006-519711 | 8/2006 |
| WO | WO 2004/068198 | 8/2004 |

* cited by examiner

*Primary Examiner* — James Greece
(74) *Attorney, Agent, or Firm* — Cozen O'Connor

(57) ABSTRACT

Provided are a wafer lens production method, an intermediate die, an optical component, a molding die, and a molding die production method. The production method of a wafer lens (1) includes a first intermediate die production step using a die (7), a second intermediate die production step using the first intermediate die (8), and a wafer lens production step using the second intermediate die (9). A first intermediate-die substrate (80) is provided with a depressed section (85) on the surface facing the die (7). When photo-curable resin (84A) is pressed, at least a portion closer to the first intermediate-die substrate (80) among the top (71a) and the peripheral section (77) of the die (7) is arranged in the depressed section (85), and a gap is provided so that the die (7) does not contact with a depressed plane (85a) of the depressed section (85).

13 Claims, 21 Drawing Sheets

US 8,792,180 B2

PRODUCTION METHOD OF WAFER LENS, INTERMEDIATE DIE, OPTICAL COMPONENT, MOLDING DIE, AND PRODUCTION METHOD OF MOLDING DIE

RELATED APPLICATIONS

This application is a U.S. National Phase Application under 35 USC 371 of International Application PCT/JP2010/056306 filed Apr. 7, 2010.

This application claims the priority of Japanese application No. 2009-141325 filed Jun. 12, 2009, and JP 2009-187099 filed Aug. 12, 2009, the entire content of both of which are hereby incorporated by reference.

TECHNICAL FIELD

The present invention relates to a production method of a wafer lens, an intermediate die, an optical component, molding die and a production method of a molding die.

BACKGROUND ART

Conventionally, in the field of lens production, the techniques to obtain optical lenses with high heat-resistance by preparing lens sections formed of curable resin on a glass substrate have been studied. As an example of a production method of an optical lens employing the technique, there has been proposed a method of forming a so-called "wafer lens" that lens sections as molded bodies of curable resin, for example plural refractive lenses, are formed on a surface of a glass substrate, and of cutting the glass substrate together with the lens sections after that.

As a production method of a wafer lens, there is provided, for example, a method of using two intermediate dies such that a first intermediate die (sub-master) made of resin is molded by a die (master), a second intermediate die (sub-sub-master) also made of resin is subsequently molded by the first intermediate die, and a wafer lens made of resin is produced by using the second intermediate die (for example, see Patent Literature 1 and 2). Especially, Patent Literature 2 discloses a so-called step-and-repeat method wherein lens sections are formed successively on a glass substrate with a large diameter.

The method of producing a wafer lens by using two intermediate dies will be described below.

FIGS. 28a and 28b show a method of producing first intermediate die 8G from die 7G. At first, as shown in FIG. 28a, resin 84H is dripped on the upper surface of die 7G which includes molding section 71G having a negative shape corresponding to a shape of an optical surface of convex lens section 11G (see FIG. 30b) of wafer lens 1G (a dispensing step). Then, a first area as a part of first intermediate-die substrate 80G is positioned over die 7G to be in a sucked and stationary condition. After that, first intermediate-die substrate 80O is moved down toward die 7G which has been arranged at a lower position, to press resin 84H against the first area of first intermediate-die substrate 80G (an imprinting step). At that time, in order to avoid flat section 72G which is arranged around molding section 71G of die 7G to connect with the molding section 71G from hitting first intermediate-die substrate 80G, first intermediate-die substrate 80G is stopped to form a constant gap S4 between die 7G and first intermediate-die substrate 80G. The amount of gap S4 in FIG. 28a is assumed to be ΔH. The amount ΔH is not only an amount required to mechanically avoid the hitting, but also is an amount determined in consideration of securing a minimum gap required in view of molding resin 84H. After that, while the position in height of first intermediate-die substrate is kept as it is, resin 84H filling molding sections 71G is irradiated with light from an upper position of first intermediate-die substrate 80G to be hardened with light (an exposure step). Then, while first intermediate-die substrate 80G is moved upward, resin 84H is released from die 7G (a die-releasing step). After that, die 7G is shifted by a predetermined amount as shown in FIG. 2, the above dispensing step, imprinting step and exposure step are performed at the prescribed position (corresponding to a second area of first intermediate-die substrate 80G), and these steps are repeated to perform a molding process in the so-called step-and-repeat method. Employing such the structure brings the advantage that a molding die covering a broad area can be molded with a small die.

However, when such the molding process using the step-and-repeat method is employed, gap X of the prescribed amount is generated between the first area and the neighboring second area after the molding process at the first area, as shown in FIG. 2. It is generated because the positions of the first area and the neighboring second area cannot be matched with perfect accuracy in position.

As the result, first intermediate die 8 including groove section 86G in which the ground of first intermediate-die substrate 80G shows, on the bottom surface of first intermediate-die substrate 80G, is produced, as shown in FIG. 28b. It is caused because resin 84H does not go there.

Further, when a first intermediate die is molded with a die, a second intermediate die is molded with the first intermediate die, and an optical element is molded with the second intermediate die, by employing such the step-and-repeat method, the following structures are provided.

FIGS. 29a and 29b show a method of molding second intermediated die 9G with first intermediate die 8G. As shown in FIG. 29a, resin 94H is dripped on the upper surface of first intermediate die 8G (a dispensing step). Then, second intermediate-die substrate 90G is positioned over first intermediate die 8G to be in a sucked and stationary condition. After that, second intermediate-die substrate 90G is moved down toward first intermediate die 8G which has been arranged at a lower position, to press resin 94H against second intermediate-die substrate 90G (an imprinting step). At that time, in order to avoid the most projecting part of resin section 84G of first intermediate die 8G from hitting second intermediate-die substrate 90G, first intermediate die 8G is stopped to form gap S5 of the amount of ΔH between first intermediate die 8G and second intermediate-die substrate 90G. After that, the exposure step and the die-releasing step are similarly performed, and second intermediate die 9G including molding sections 91G on the bottom surface of second intermediate-die substrate 90G can be produced, as shown in FIG. 29b. Herein, sign 93G represents a part where resin 94H entering groove section 86G of first intermediate die 8G is hardened, and the part is highest in resin section 94G of second intermediate die 9G.

FIGS. 30a and 30b show a method of molding wafer lens 1G as an end product with second intermediate die 9G. As shown in FIG. 30a, resin 4H is dripped on the upper surface of second intermediate die 9G (a dispensing step). Then, glass substrate for a wafer lens is positioned over second intermediate die 9G to be in a sucked and stationary condition. After that, glass substrate 2G is moved down toward second intermediate die 9G which has been arranged at a lower position, to press resin 4H against glass substrate 2G (an imprinting step). At that time, in order to avoid the most projecting part of resin section 94G of second intermediate die 9G from hitting glass substrate 2G, second intermediate die 9G is stopped to form gap S6 of the amount of ΔH between second intermediate die 9G and glass substrate 2G. After that, the exposure step and the die-releasing step are similarly performed, and wafer lens 1G can be produced as shown in FIG. 30b. As the result, the height of flat section 12G formed around convex lens section 11G and connecting the convex lens section 11G of wafer lens 1G is 2ΔH from glass substrate 2G, which is twice of gap ΔH being required for avoiding the hitting in one molding processing described above.

In other words, the situation that groove section 86G of the first intermediate die is formed, is a cause of the situation that gap ΔH, which is required when the second intermediate die is formed with the first intermediate die, grows into the twice amount of gap when a lens is finally formed with the second intermediate die.

CITATION LIST

Patent Literature

Patent Literature 1: Japanese Translation of PCT International Application Publication No. 2006-519711
Patent Literature 2: US Patent Application Publication No. 2006/0259546

SUMMARY OF INVENTION

Technical Problem

As described above, when the first intermediate die and the second intermediate die are molded with a die and a wafer lens is subsequently molded, it is required that a proper distance ΔH is provided between a die and a substrate in order to avoid a projecting part of the die from hitting the substrate in the imprinting step. If two intermediate dies are used, the wafer lens is required to be molded to have a thickness being thicker by 2ΔH than the thickness originally required as a wafer lens. As the result, when wafer lenses are vertically layered to form a wafer lens unit, the unit becomes thick in the optical axis direction, which is disadvantageous for downsizing.

Further, when the step-and-repeat method described in Patent Literature 2 is used, a lens material to be molded is dispensed on a glass substrate with a large diameter, then, one die including one molding section is pressed against the material on the substrate to form one lens section, and the similar steps are successively performed to form plural lens sections. That is, the step-and-repeat method of using an array master die including plural molding sections is not performed, and one molding die has just one molding section. Therefore, after the material within one molding section is hardened and released from the die, the next material is dispensed in the molding section and is hardened. Since the hardening and molding process is performed for the lens sections one by one, it has not expected that the neighboring lens sections are connected together, and such the problem has not been caused.

On the other hand, under the condition that an array master die including plural molding sections is used, a material to be molded is separately dispensed to respective molding sections. When the material to be molded overflows from one molding section because of the dispensing amount of the material, the material in the neighboring molding section is also unhardened and liquid, and the bodies of the material in the molding sections are connected together when they are hardened, which is a problem. Further, once the bodies of the material to be molded are connected together, the stress becomes as extremely large as several times of the original stress when the material is hardened and shrinks, which causes further problems that the forms of intermediated dies and transforming die used in later steps are deteriorated and the die release characteristics are deteriorated.

The present invention has been achieved in view of the above situations and is aimed to provide a production method of a wafer lens, an intermediate die, an optical component, and molding die, where the production method of a wafer lens can be used for downsizing the wafer lens without making a resin portion such as a lens section formed on a substrate excessively thicker, and to provide a production method of a molding die having an excellent form and excellent die release characteristics.

Solution to Problem

According to one embodiment of the present invention, there is provided a production method of a wafer lens in which a plurality of lens sections formed of photo-curable resin are arranged on at least one surface of a substrate. The production method is characterized by comprising.

a first intermediate die production step of producing a first intermediate die including a lens section having a positive shape corresponding to an optical surface shape of the optical component, by filling a space between a die and a first intermediate-die substrate with photo-curable resin and pressing the photo-curable resin, and by hardening the photo-curable resin with light irradiation, where the die includes a molding section having a negative shape corresponding to the optical surface shape of the lens sections, wherein the first intermediate die production step comprises the following sub-steps i) to vii):

i) preparing the first intermediate-die substrate, ii) filling the molding section of the die with photo-curable resin by dispensing the photo-curable resin to the die and by pressing a first area being a part of a surface of the first intermediate-die substrate against the die, iii) hardening the photo-curable resin by irradiating the photo-curable resin which has filled the molding section with light, iv) releasing the die from the photo-curable resin after the hardening, v) filling the molding section of the die with photo-curable resin by dispensing the photo-curable resin to the die which has been released and by pressing a second area arranged to be separated at a predetermined interval from the first area in the first intermediate-die substrate against the die, vi) hardening of the photo-curable resin by irradiating the photo-curable resin which has filled the molding section with light, and vii) releasing the die from the photo-curable resin after the hardening, a second intermediate die production step of producing a second intermediate die including a molding section having a negative shape corresponding to the optical surface shape of the lens sections of the wafer lens, by filling a space between the first intermediate die obtained in the first intermediate die production step and a second intermediate-die substrate which is different from the first intermediate die, with photo-curable resin, and pressing the photo-curable resin, and by hardening the photo-curable resin with light irradiation; and a wafer lens production step of producing the wafer lens including a plurality of the lens sections, by filling a space between the second intermediate die and the substrate with photo-curable resin, and pressing the photo-curable resin, and by hardening the photo-curable resin with light irradiation, wherein a depressed section is formed on a surface of the first intermediate-die substrate, facing the die, where the depressed section is configured such that at least a portion which is closer to the first intermediate-die substrate than the other among a top of the molding section of the die and a peripheral section connecting with the molding section of the die is arranged in the depressed section, and when the photo-curable resin filling the space between the die and the first intermediate-die substrate is pressed, the portion which is closer to the first intermediate-die substrate than the other among the top of the molding section and the peripheral section of the die is arranged inside the depressed section and a gap is arranged so as to prevent the portion which is closer to the first intermediate-die substrate than the other among the top of the molding section and the peripheral section of the die from touching a depressed plane forming the depressed section.

According to another embodiment of the present invention, there is provided an intermediate die for use in a production of a wafer lens in which a plurality of optical components formed of photo-curable resin are arranged on at least one surface of a substrate. The intermediate die comprises: an intermediate-die substrate and a molding section arranged on the intermediate-die substrate and having a positive shape or a negative shape corresponding to an optical surface shape of the optical components. The intermediate die is characterized in that:

a depressed section is formed on the intermediated-die substrate, where the depressed section is configured such that at least a portion which is closer to the intermediate-die substrate than the other among a top of the molding section and a peripheral section connecting with the molding section is arranged in the depressed section, and the portion which is closer to the intermediate-die substrate than the other among the top of the molding section and the peripheral section is arranged inside the depressed section, and a predetermined gap is arranged so as to prevent the portion which is closer to the intermediate-die substrate than the other among the top of the molding section and the peripheral section from touching a depressed plane forming the depressed section.

According to another embodiment of the present invention, there is provided an optical component comprising a substrate and a resin molded section formed by hardening photo-curable resin on at least one surface of the substrate, where a part of the resin molded section includes a concave or convex refractive lens section. The optical component is characterized in that at least one surface of the substrate comprises a depressed section, the resin molded section comprises the concave or convex refractive lens section and a resin flat section connecting with the concave or convex refractive lens section, on a surface on which the depressed section is formed in the substrate, and the refractive lens section is configured such that an area obtained when the concave or convex refractive lens section is projected onto the substrate in a direction parallel with an optical axis is located within the depressed section of the substrate.

According to the another embodiment of the present invention, there is provided a molding die for use in a production of a wafer lens in which a plurality of refractive lens sections formed of photo-curable resin are arranged on at least one surface of a substrate, the molding die comprising a molding section in a positive shape or negative shape corresponding to an optical surface shape of the lens sections, and a periphery molding section for molding a periphery of the molding section. The molding die is characterized in that each of the molding section and the periphery molding section comprises a substance having a function to absorb light with a predetermined wavelength for hardening the photo-curable resin.

According to the another embodiment of the present invention, there is provided a production method of a molding die for producing a molding die formed of curable resin on a substrate by using a die a plurality of times, wherein, in the die, a plurality of sets of a lens molding section and a flange molding section connecting with a periphery of the lens molding section are divided into sections by depressed sections. The production method is characterized by comprising:

a dispensing step of dispensing curable resin to a space between a first position of the substrate and each of the plurality of sets of the lens molding section and the flange molding section which are formed on the die, separately;

a hardening step of hardening the curable resin between the die and the substrate after the dispensing step;

a die-releasing step of releasing the die from the curable resin after the hardening step;

a dispensing step of dispensing curable resin to a space between a second position of the substrate and each of the plurality of sets of the lens molding section and the flange molding section which are formed on the die, separately, where the second position is a different position from the first position;

a hardening step of hardening the curable resin between the die and the substrate after the dispensing step; and a die releasing step of releasing the die from the curable resin after the hardening step, wherein a die releasing treatment is applied to the flange molding sections of the die and rise surfaces which connect with the flange molding sections and form the depressed sections, and in the dispensing steps, a dispensed volume of the curable resin which is dispensed to a space between the substrate and each of the plurality of sets of the lens molding section and the flange molding section of the die is greater than a volume of a space which is formed between the substrate and each of the plurality of sets of the lens molding section and the flange molding section of the die.

Advantageous Effects of Invention

The present invention can reduce the thickness of a gap coming from a groove section of the first intermediate die which is generated unavoidably because of the use of the step-and-repeat method, even under the condition that a first intermediate die, a second intermediate die and wafer lens are produced with a die by using the step-and-repeat method, which does not make resin portions of a molding section and a peripheral section of the first intermediate die excessively thick and allows downsizing of the first intermediate die. Further, the present invention works to downsize a wafer lens produced by using such the first intermediate die.

The present invention allows the hardened curable resin being easily removed from a die by a die-releasing treatment applied on respective flange molding sections and step sections.

Further, a dispensing volume of the curable resin becomes larger than a volume of a space formed between a substrate and each set of lens molding section and flange molding section of the die. Thereby, sink marks generated when the curable resin is hardened and shrinks can be prevented and a molding die in an excellent shape can be produced.

Further, the die is divided into sections each including a lens section and a flange section by using depressed sections, and has a structure to include a rise surface between the flange molding section and the depressed section. Therefore, it can be prevented that curable resin dispensed into a lens molding section is hardened with connecting together with that dispensed in the neighboring lens molding section. Furthermore, the curable resin is hardened to be a tapered shape such that the width increases toward the substrate side, which also makes the die-releasing characteristics for the die excellent.

Figure 3A:
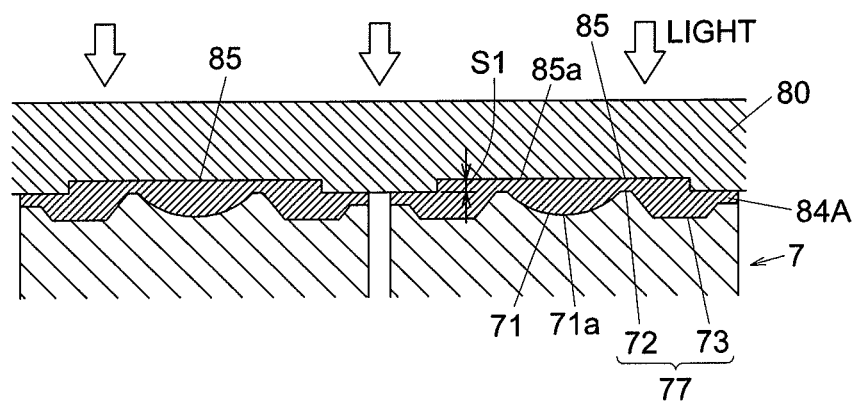
Figure 3B:
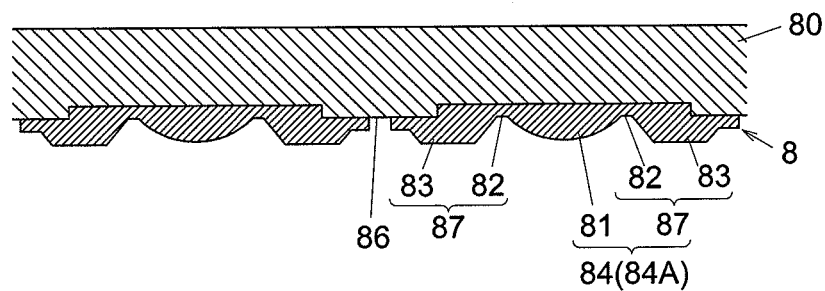

Each of FIGS. 3a and 3b is a side view showing a part of a producing method of the wafer lens relating to the first embodiment of the present invention, which is the situation that a first intermediate die is produced.

Figure 4A:
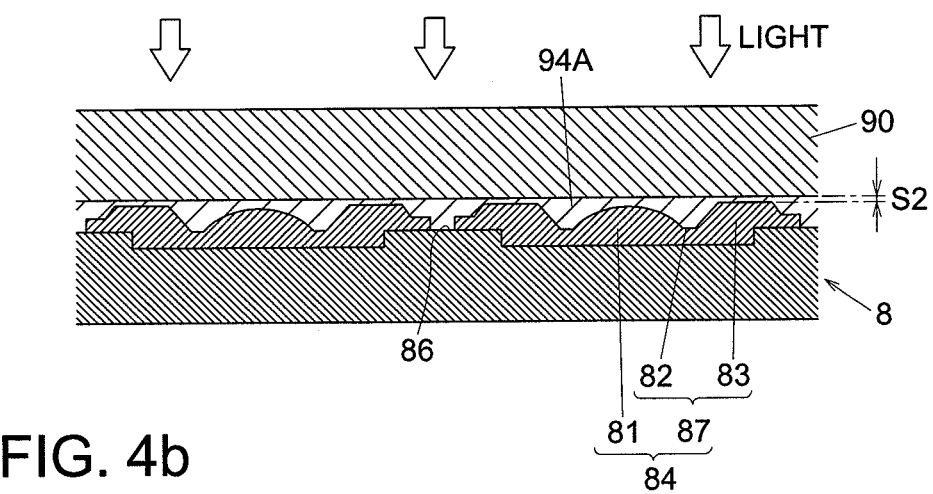
Figure 4B:
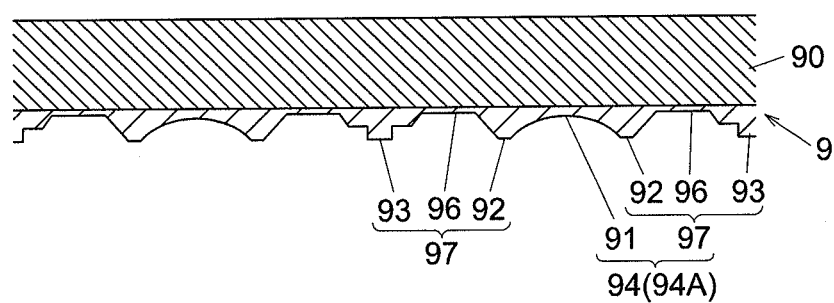

Each of FIGS. 4a and 4b is a side view showing a part of a producing method of the wafer lens relating to the first embodiment of the present invention, which is the situation that a second intermediate die is produced, starting from the condition of FIG. 3.

Figure 5A:
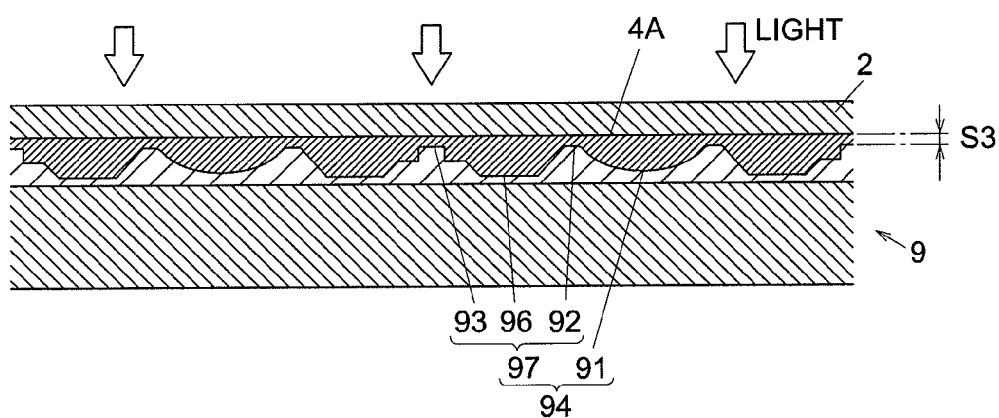
Figure 5B:
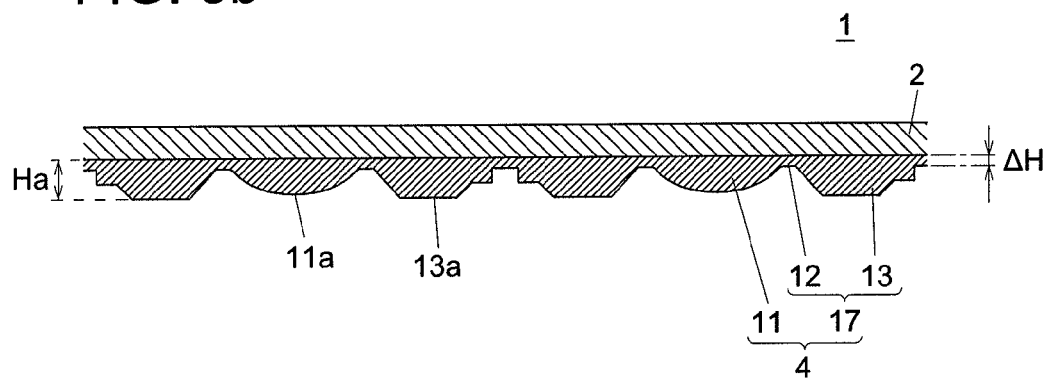

Each of FIGS. 5a and 5b is a side view showing a part of a producing method of the wafer lens relating to the first embodiment of the present invention, which is the situation that a wafer lens is produced, starting from the condition of FIG. 4.

Figure 6:
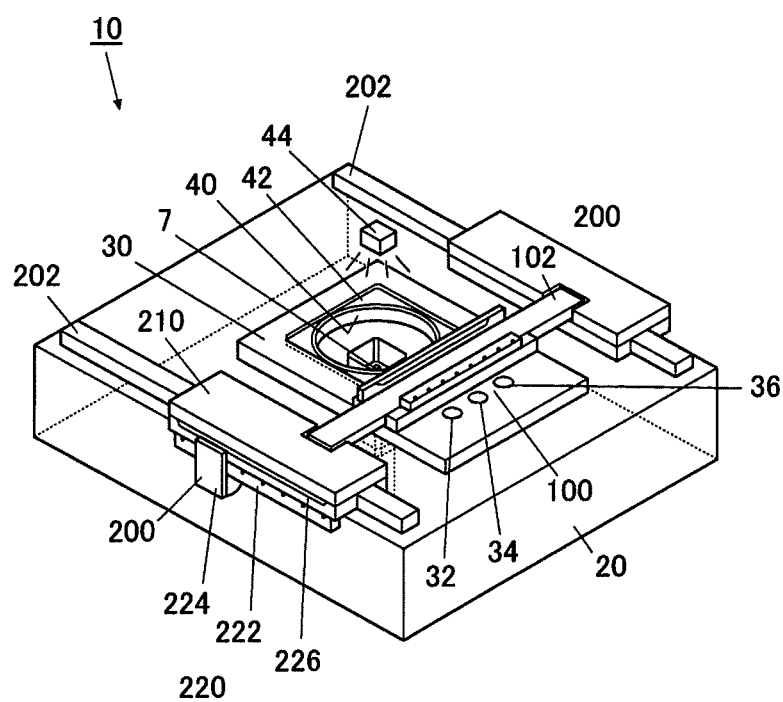
Figure 6:
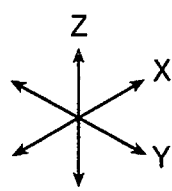

FIG. 6 is a perspective view showing a schematic structure of a producing apparatus.

Figure 7:
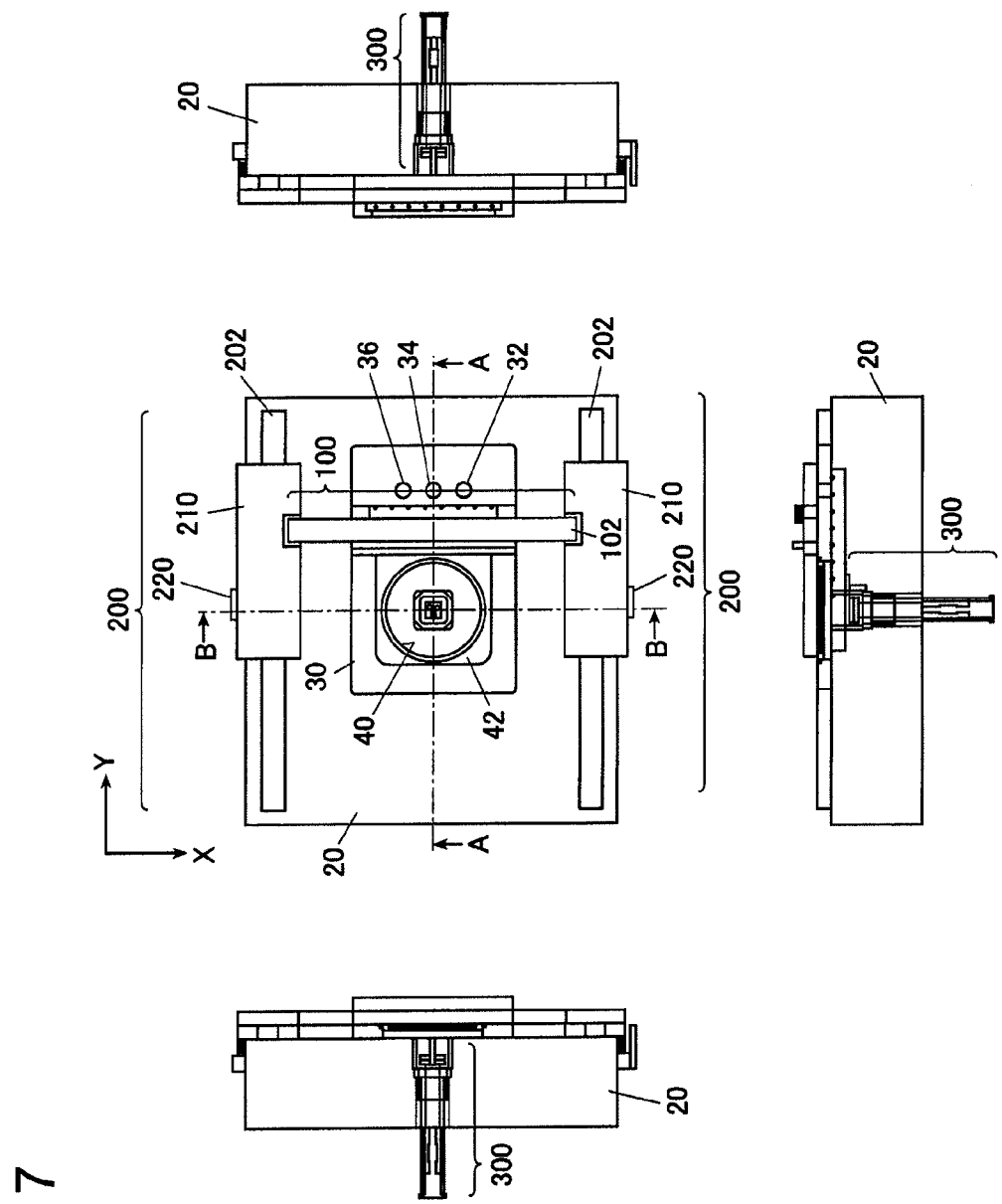

FIG. 7 is a plan view showing the producing apparatus of FIG. 6.

Figure 8:
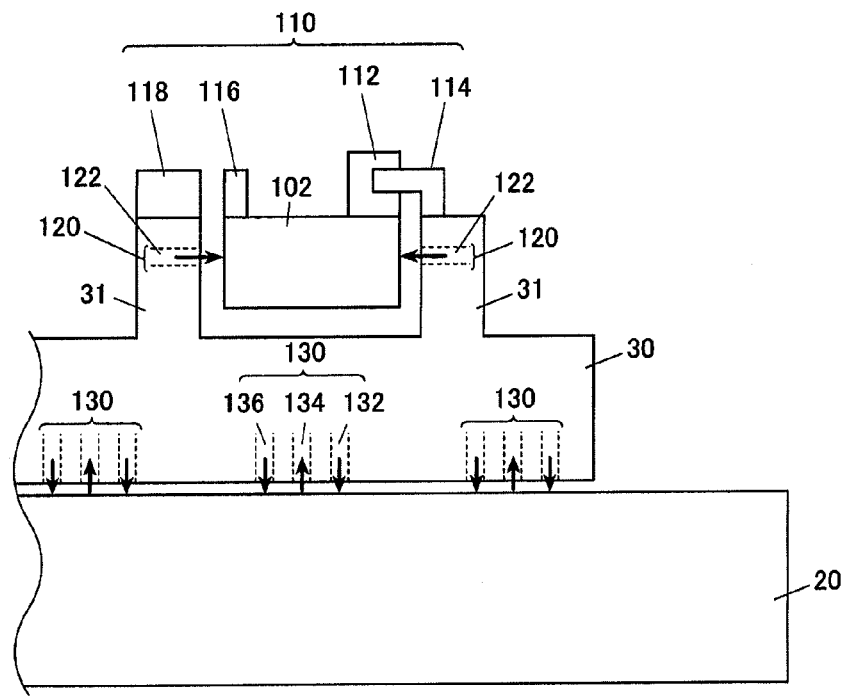

FIG. 8 is a diagram showing a schematic structure of a X-axis transfer mechanism and is a sectional view taken along line A-A in FIG. 7.

Figure 9:
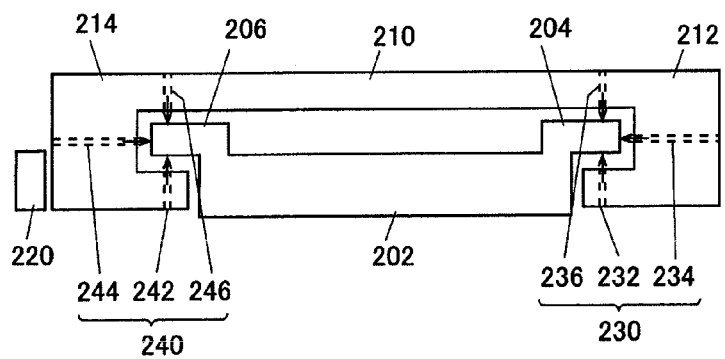

FIG. 9 is a diagram showing a schematic structure of a Y-axis transfer mechanism and is a sectional view taken along line B-B in FIG. 7.

Figure 10:
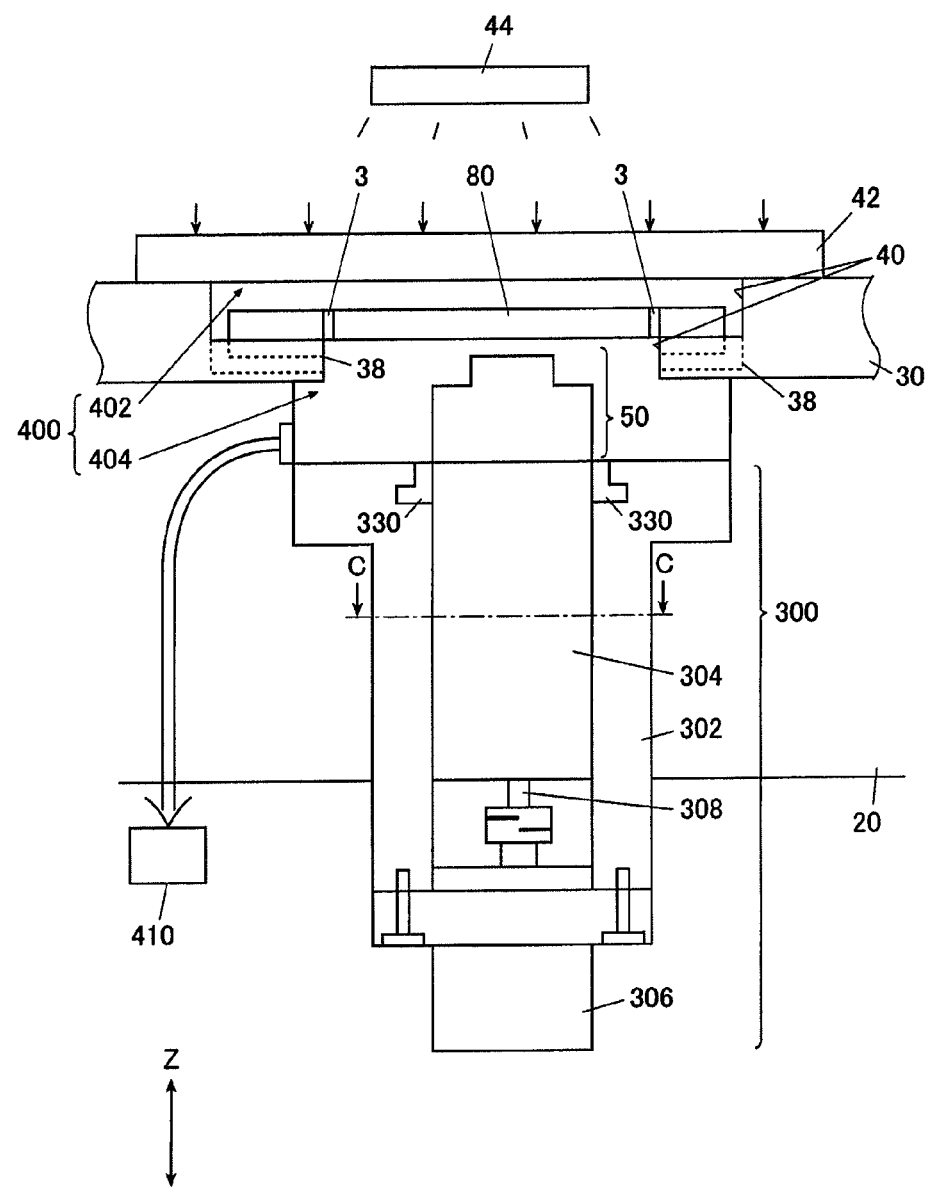

FIG. 10 is a sectional view showing a schematic structure of a XY-stage and a surface plate.

Figure 11A:
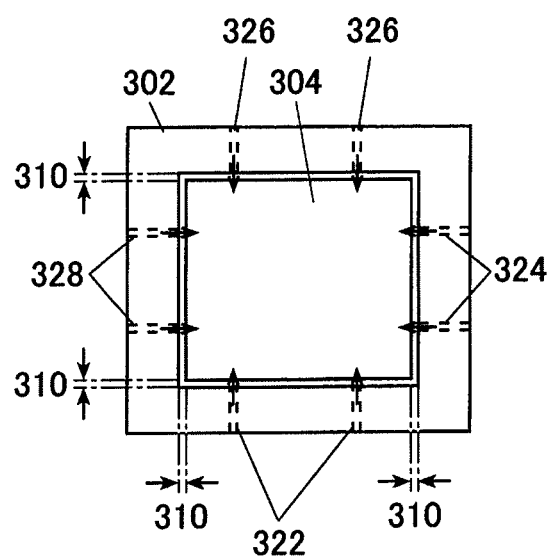
Figure 11B:
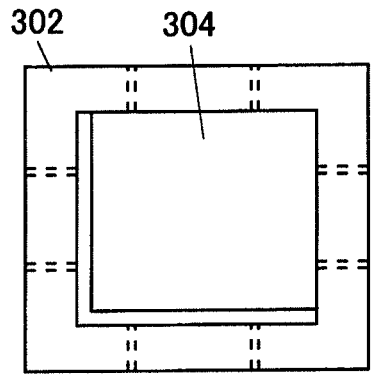

Each of FIGS. 11a and 11b is a sectional view taken along line C-C in FIG. 10.

Figure 12:
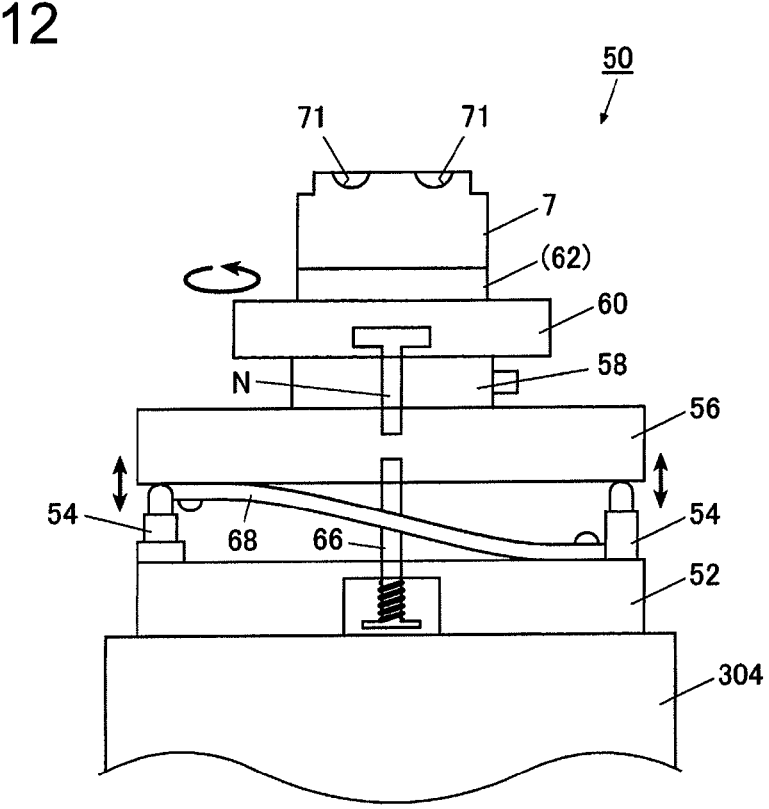

FIG. 12 is a sectional view showing a schematic structure of a die section.

Figure 13:
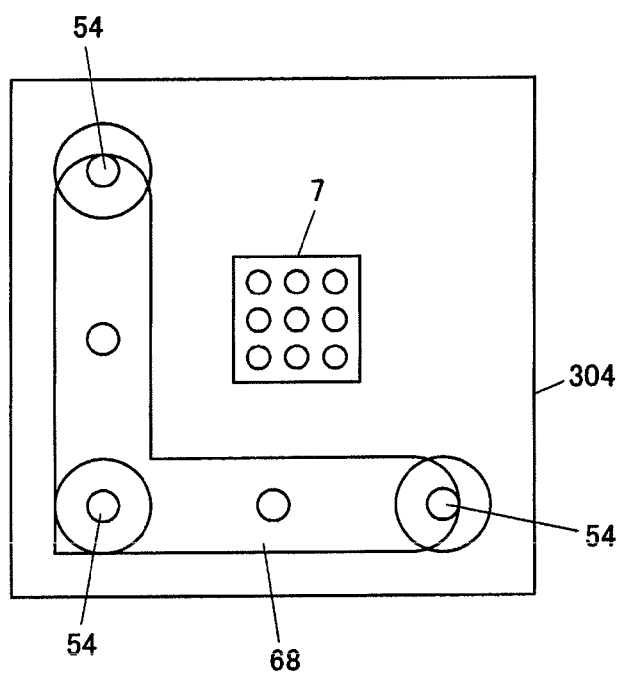

FIG. 13 is a plan view showing a schematic structure of FIG. 12.

Figure 14:
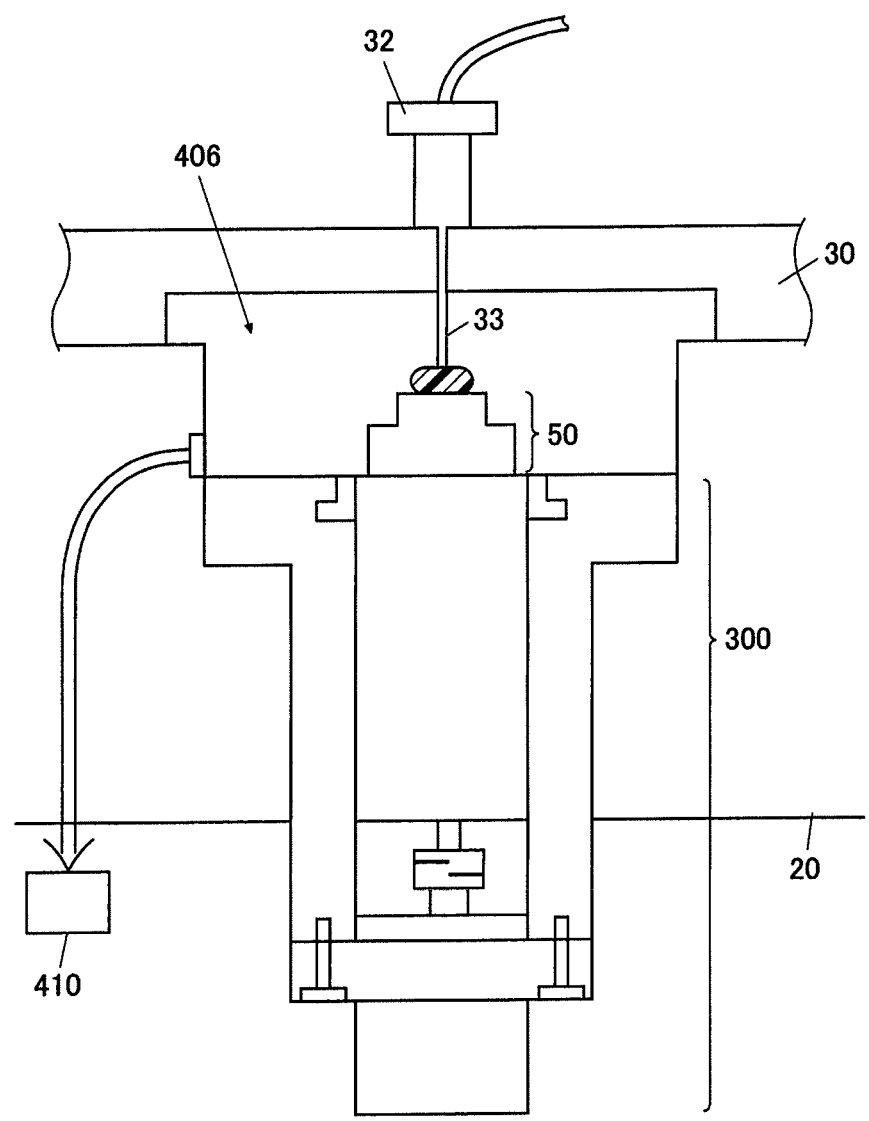

FIG. 14 is a sectional view showing a schematic structure provided when a dispenser is arranged to face a die.

Figure 15:
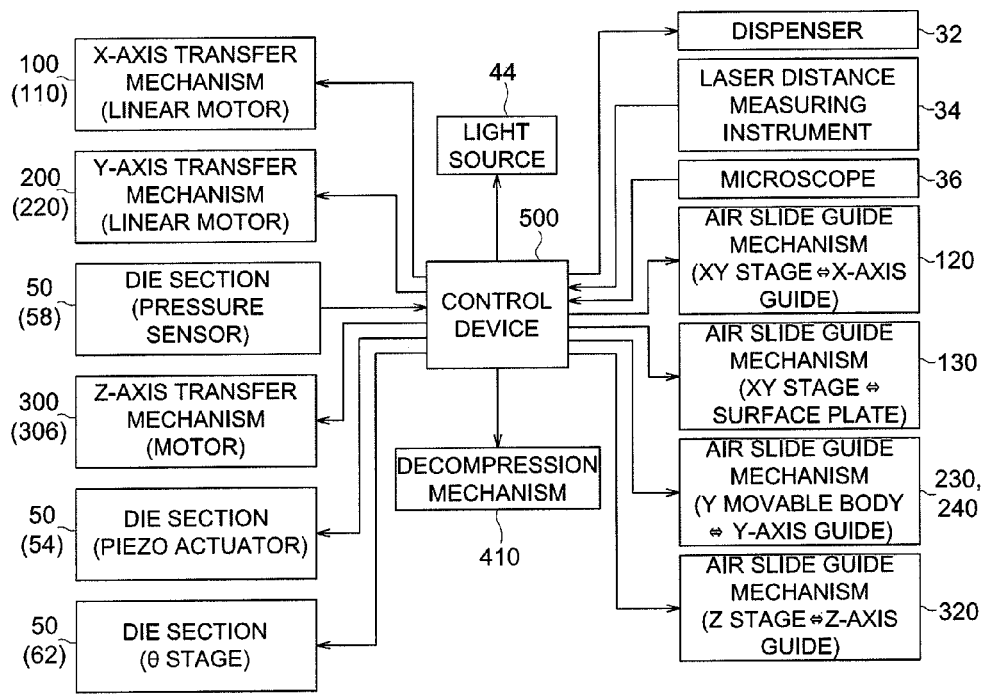

FIG. 15 is a block diagram showing a schematic control structure.

Figure 16:
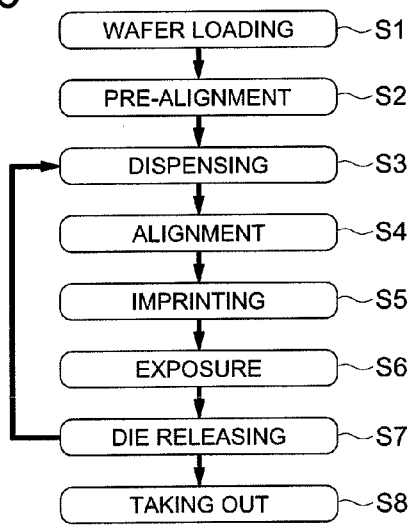

FIG. 16 shows a schematic flowchart for describing a production method of a wafer lens with the passage of time.

Figure 17:
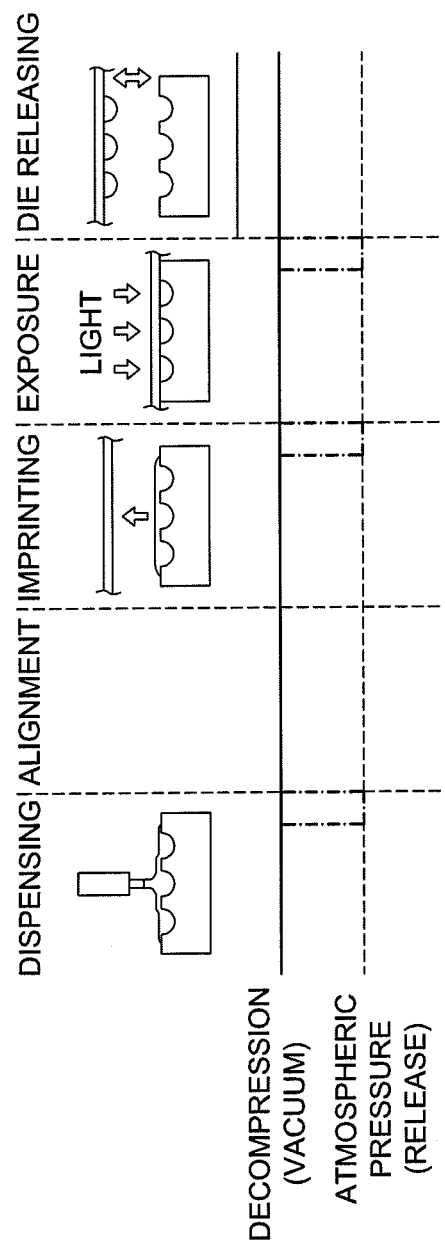

FIG. 17 is a timing diagram schematically showing a pressure condition in a period from the dispensing step to the die-releasing step in FIG. 16.

Figure 18:
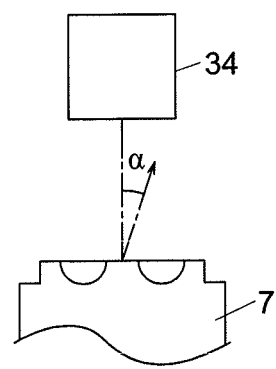

FIG. 18 is a diagram for schematically illustrating a structure for adjusting the degree of parallelization of a glass substrate and a die.

Figure 19:
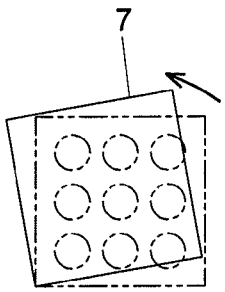
Figure 19:
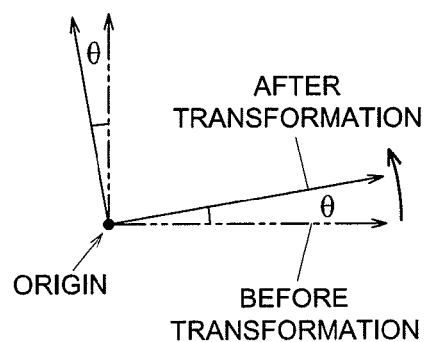

FIG. 19 is a diagram for schematically illustrating a transformation of coordinate axes of a die on a two-dimensional plane.

Figure 20:
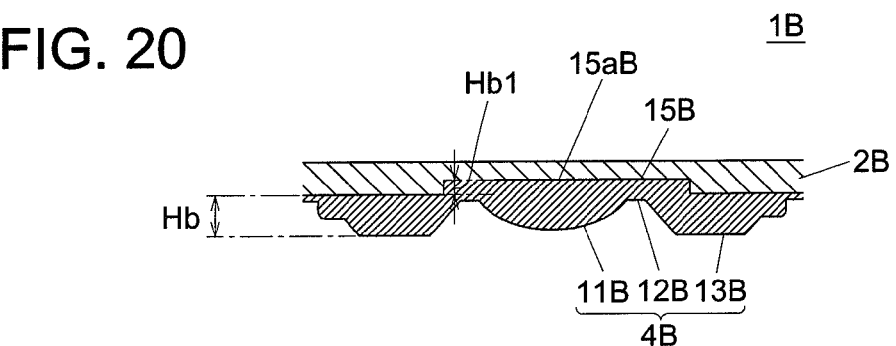

FIG. 20 is a side view showing a schematic structure of a wafer lens relating to the second embodiment of the present invention.

Figure 21:
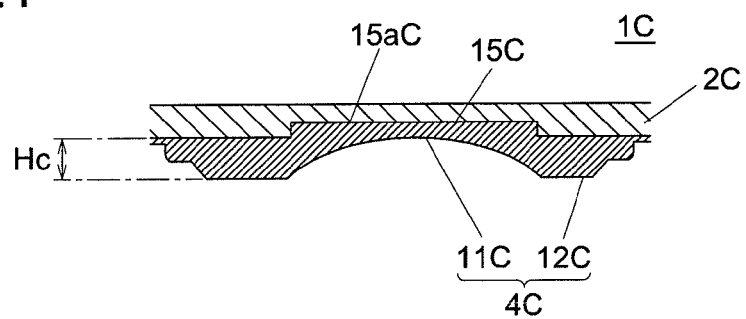

FIG. 21 is a side view showing a schematic structure of a wafer lens relating to the second embodiment of the present invention.

Figure 22:
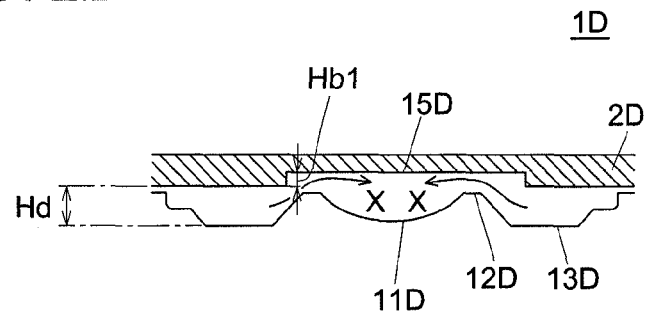

FIG. 22 is a side view showing a schematic structure of a wafer lens relating to the third embodiment of the present invention.

Figure 23:
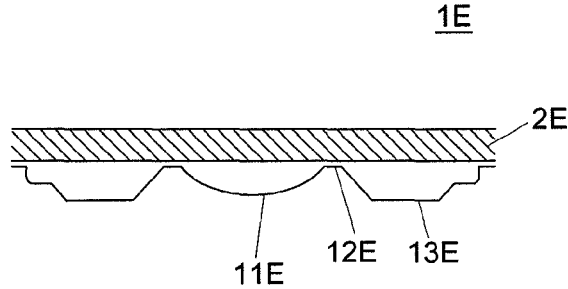

FIG. 23 is a side view showing a schematic structure of a wafer lens relating to the third embodiment of the present invention.

Figure 24:
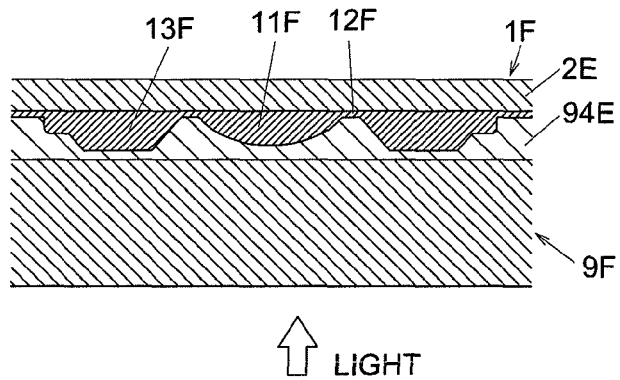

FIG. 24 is a side view showing a schematic structure of a wafer lens relating to the fourth embodiment of the present invention.

Each of FIGS. 25a to 25d is a side view showing a part of a production method of a wafer lens, which is the situation that an intermediate die is produced.

Figure 25A:
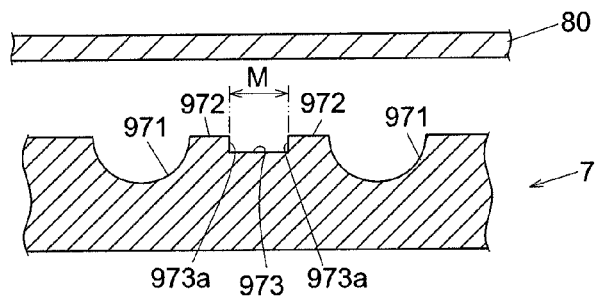
Figure 25B:
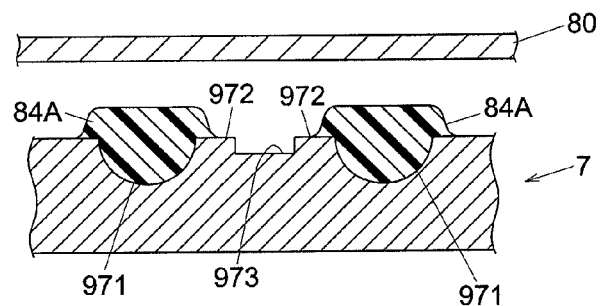
Figure 25C:
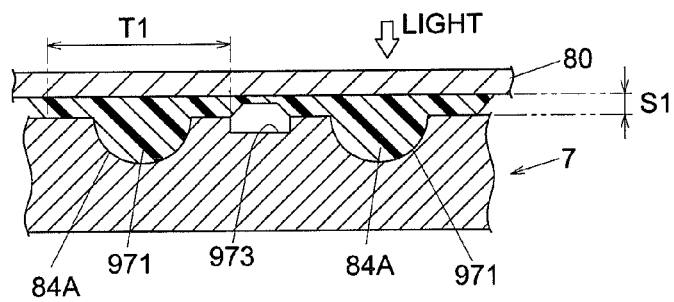
Figure 25D:
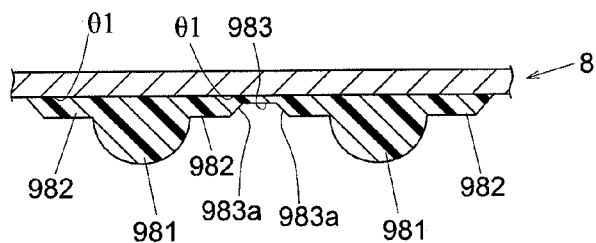
Figure 26A:
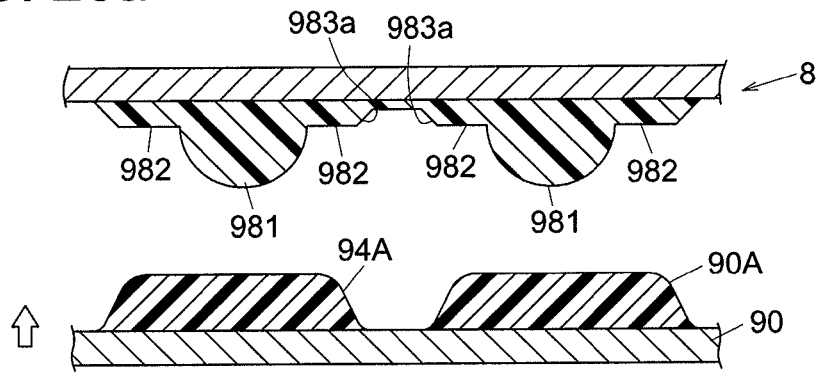
Figure 26B:
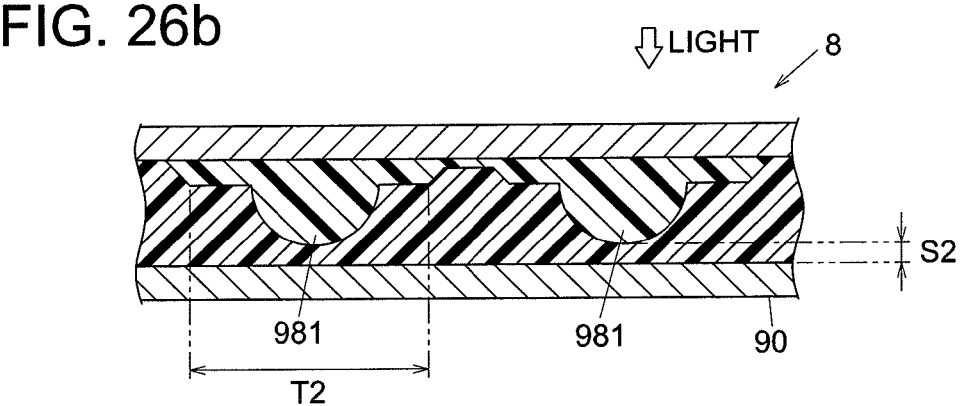
Figure 26C:
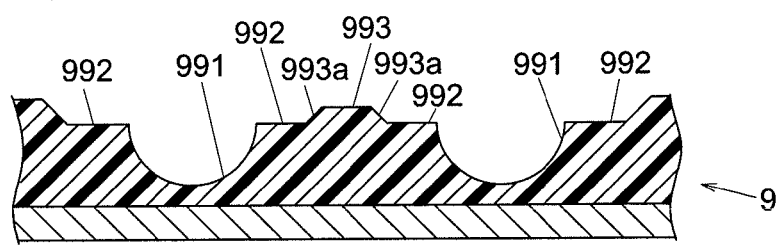

Each of FIGS. 26a to 26c is a side view showing a part of a production method of a wafer lens, which is the situation that a transfer die is produced, starting from the condition of FIGS. 25a to 25d.

Figure 27A:
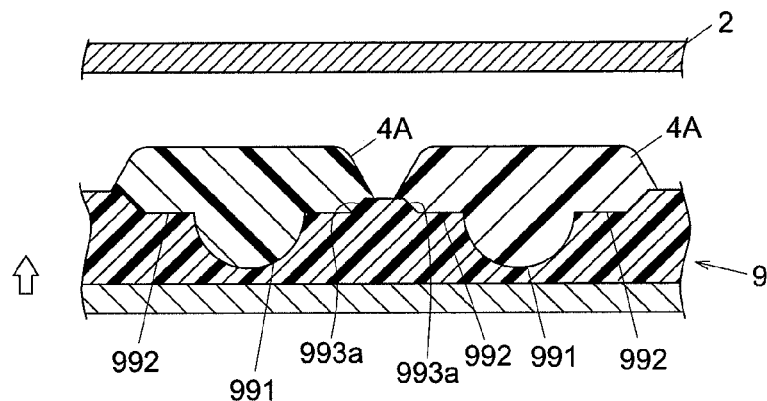
Figure 27B:
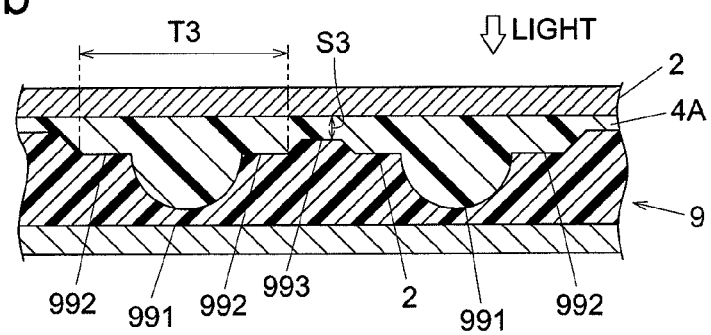
Figure 27C:
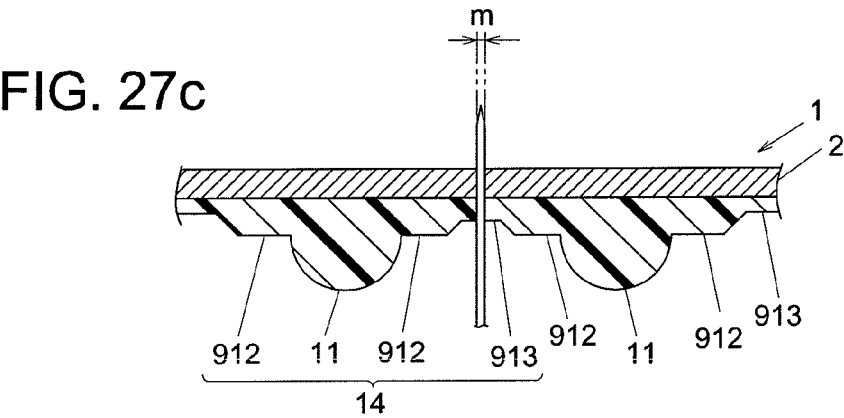

Each of FIGS. 27a to 27c is a side view showing a part of a production method of a wafer lens, which is the situation that a wafer lens is produced, starting from the condition of FIGS. 26a to 26c.

Figure 28A:
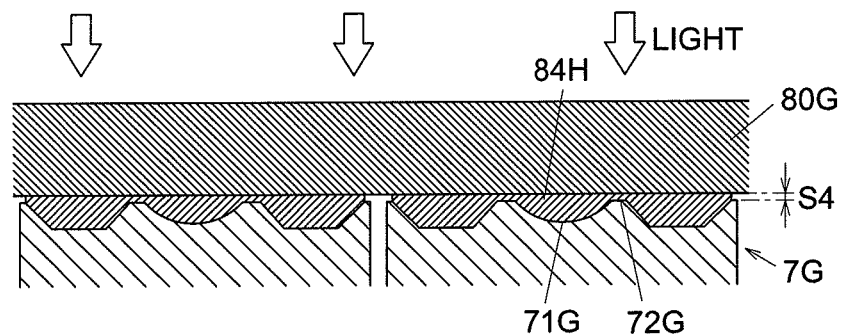
Figure 28B:
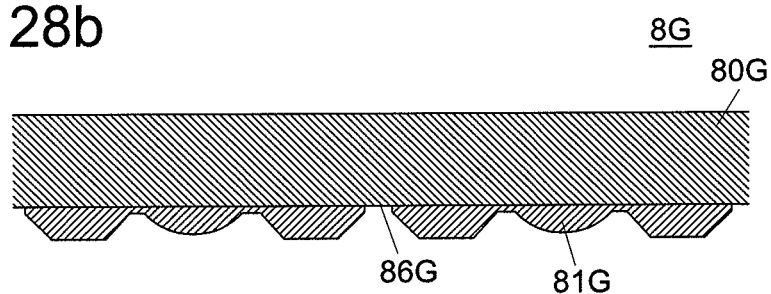

Each of FIGS. 28a and 28b is a side view showing a part of a production method of a wafer lens in a conventional art and showing the case that a first intermediate die is produced.

Figure 29A:
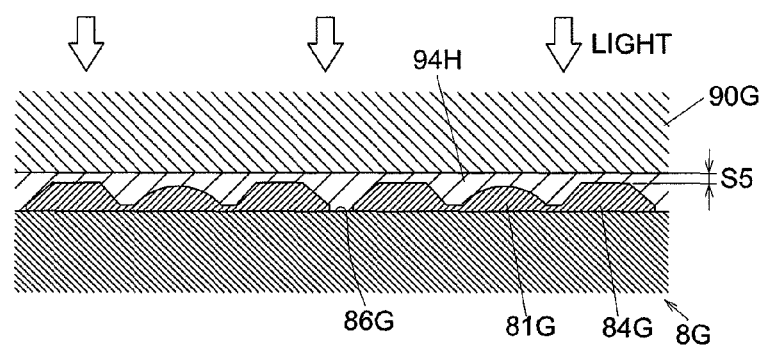
Figure 29B:
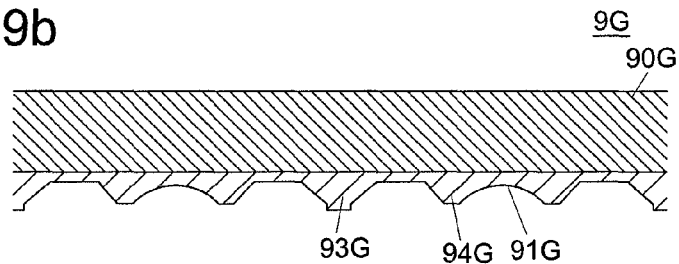

Each of FIGS. 29a and 29b is a side view showing a part of a production method of a wafer lens in a conventional art, which is the situation that a second intermediate die is produced, starting from the condition of FIGS. 5a and 5b.

Figure 30A:
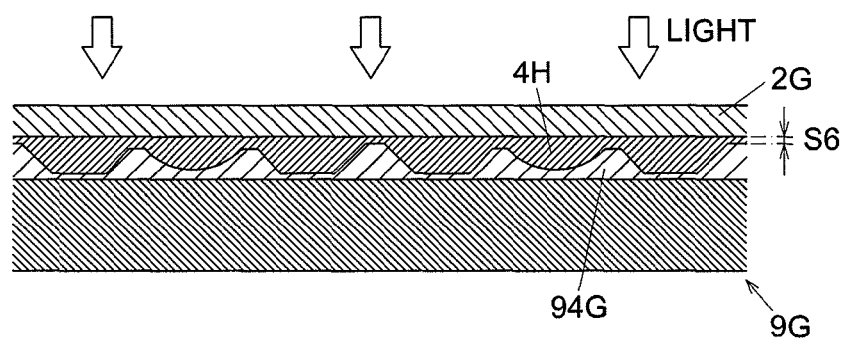
Figure 30B:
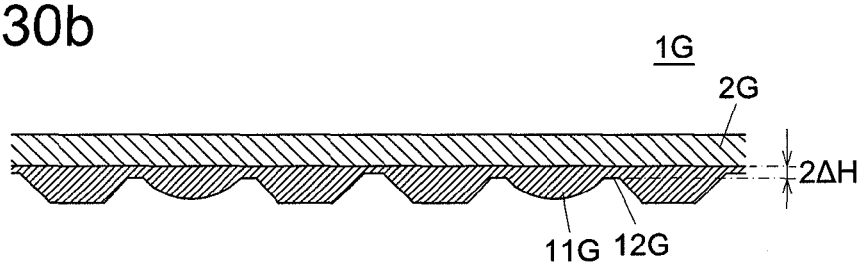

Each of FIGS. 30a and 30b is a side view showing a part of a production method of a wafer lens in a conventional art, which is the situation that a wafer lens is produced, starting from the condition of FIGS. 29a and 29b.

DESCRIPTION OF EMBODIMENTS

Hereinafter, preferable embodiments of the present invention will be described with reference to the drawings.

[First Embodiment]

Figure 1:
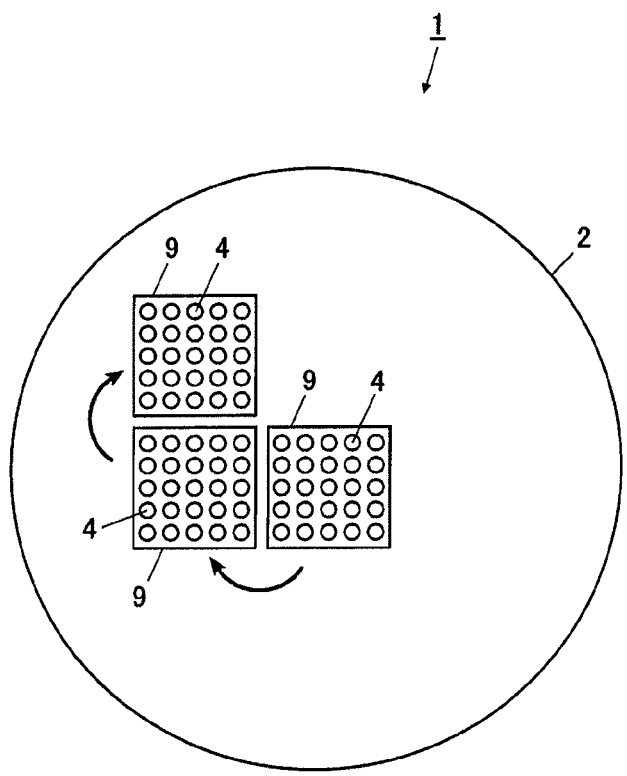
FIG. 1 is a plan view showing a schematic structure of a wafer lens.
Figure 2:
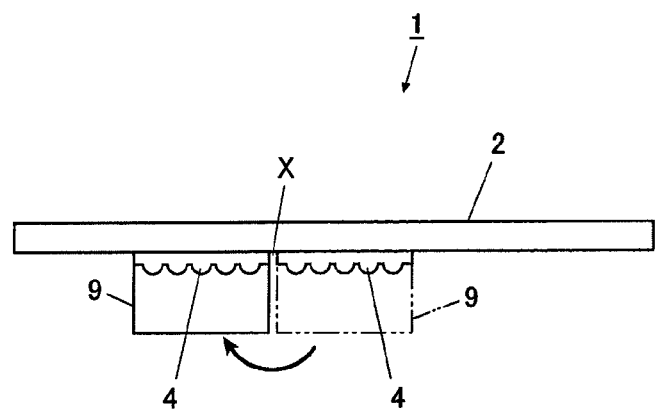
FIG. 2 is a side view showing a schematic structure of the wafer lens.

As shown in FIG. 1 and FIG. 2, wafer lens 1 includes glass substrate 2 in a round shape and resin sections 4 formed on one surface of the glass substrate 2.

Resin section 4 includes convex lens sections 11 each becoming a convex optical surface, and peripheral sections 17 each formed around convex lens section 11 to connect with convex lens section 11. Peripheral section 17 includes flat section 12 having a ringed shape and formed to connect with convex lens section 11, and convex section 13 formed to connect with the flat section 12. Convex lens section 11 is preferably a refraction lens. However, convex lens section 11 is not limited to that, and a fine structure such as surface diffraction grooves and steps may be formed on the optical surface.

Resin section 4 is formed of photo-curable resin. As the photo-curable resin, for example, acrylic resin and allyl ester resin can be used. These resins can be hardened by radical polymerization.

In convex section 13, top section 13a is a flat surface, which is different from convex lens section 11. Convex section 13 is formed so that the height of top section 13a of convex section 13 is higher than the height of top section 11a of convex lens section 11.

Flat sections (thin portions) 12 are formed between convex lens section 11 and convex section 13 and formed between neighboring convex sections 13, and the height of the flat sections from glass substrate 2 are represented as ΔH. Especially, the height of flat section 12 between convex lens section 11 and convex section 13*a* is half of that in a conventional art.

Wafer lens 1 is formed in the following way, as shown in FIGS. 3*a* to 5*b*. First intermediate die 8 including molding section 81 in a positive shape (convex shape) is molded with die 7 including molding section 71 in a negative shape (concave shape) corresponding to the shape of an optical surface of convex lens section 11. Then, second intermediate die 9 including molding section 91 in a negative shape (concave shape) is molded with first intermediate die 81. The wafer lens 1 is molded with second intermediate die 9 which has been molded. In the present embodiment, resin sections 4 (convex lens sections 11), where each resin section corresponds to one second intermediate die 9 as a unit, are successively formed on one glass substrate 2 unit by unit (see arrows in FIG. 1 and FIG. 2). Finally, glass substrate 2 with convex lens sections is cut into individual pieces.

Since FIG. 1 and FIG. 2 show a certain stage of the production steps, resin sections 4 are formed on only a part of the surface of glass substrate 2. The form of resin sections 4 in FIG. 1 and FIG. 2 has been prepared by simplifying those shown in FIG. 5*b* for the convenience of preparing the drawings.

Next, a production method of wafer lens 1 will be explained.

First Intermediate Die Production Step:

FIGS. 3*a* and 3*b* show a producing method of first intermediate die 8 with die 7. As shown in FIG. 3*a*, resin 84A is dripped onto the upper surface of die 7 (a dispensing step), and first intermediate-die substrate 80 as a glass substrate is positioned over die 7 to be in a sucked and stationary condition. Herein, depressed section 85 is previously formed at a position in the bottom surface of first intermediate-die substrate 80 to be used, where the position faces top section 71*a* of molding section 71 in die 7 and peripheral section 77 (flat section 72 and a part of depressed section 73) formed to connect with molding section 71.

After that, die 7 is moved upward toward first intermediate-die substrate 80 arranged an upper position, and resin 84A is pressed against first intermediate-die substrate 80 (an imprinting step). In the present embodiment, the upward movement of die 7 is stopped at a position such that the bottom surface of first intermediate-die substrate 80 and flat section 72 of die 7 are located at the same position in the height direction. At that time, flat section 72 of die 7 is arranged within depressed section 85 of first intermediate-die substrate 80, and prescribed gap S1 is formed in order that the flat section does not touch depressed surface 85*a* forming depressed section 85. In other words, flat section 72 which projects to be closest to first intermediate-die substrate 80 is prevented from hitting the bottom surface of first intermediate-die substrate 80.

Then, while the height of die 7 is kept as described above, resin 84A filling molding section 71 is irradiated with light from an upper position of first intermediate-die substrate 80 to harden resin 84A with light (an exposure step). After the irradiation, die 7 is moved down. Thereby, resin 84A is removed from die 7 (a die-releasing step). As the result, as shown in FIG. 3*b*, there is formed first intermediate die 8 including molding section 81 on the bottom surface of first intermediate-die substrate 80, where molding section 81 has a positive shape corresponding to a shape of an optical surface of convex lens section 11 of wafer lens 1.

Around molding section 81 of first intermediate die 8 which has been produced, peripheral section 87 is formed to connect with molding section 81. Peripheral section 87 is composed of flat section 82 connecting with molding section 81, and convex section 83 connecting with flat section 82. Then, groove 86 is formed at a position between resin sections 84, 84 each composed of flat section 82 and convex section 83, and the ground of first intermediate-die substrate 80 shows because resin 84 does not flows there. Further, flat section 82 of first intermediate die 8 has the same height as the bottom surface of first intermediate-die substrate 80. The height of convex section 83 is higher than the height of molding section 81.

Second Intermediate Die Production Step:

FIGS. 4*a* and 4*b* show a method of producing second intermediate die 9 with first intermediate die 8. As shown in FIG. 4*a*, resin 94A is dripped onto the upper surface of first intermediate die 8 (a dispensing step), and second intermediate-die substrate 90 as a glass substrate is positioned over first intermediate die 8 to be in a sucked and stationary condition.

After that, first intermediate die 8 is moved upward toward second intermediate-die substrate 90 arranged an upper position, and resin 94A is pressed against second intermediate-die substrate 90 (an imprinting step). At that time, first intermediate die 8 is stopped so as to form a constant gap S2 between convex section 83 of first intermediate 8 and second intermediate-die substrate 90.

Then, while the height of first intermediate die 8 is kept as it is, resin 94A filling molding section 81 is irradiated with light from an upper position of second intermediate-die substrate 90 to harden resin 94A with light (an exposure step). After the irradiation, first intermediate die 8 is moved down. Thereby, resin 94A is removed from first intermediate die 8 (a die-releasing step). As the result, as shown in FIG. 4*b*, there is formed second intermediate die 9 including molding section 91 on the bottom surface of second intermediate-die substrate 90, where molding section 91 has a negative shape corresponding to a shape of an optical surface of convex lens section 11 of wafer lens 1.

Around molding section 91 of second intermediate die 9 which has been produced, peripheral section 97 is formed to connect with molding section 91. Peripheral section 97 is composed of flat section 92 connecting with molding section 91, depressed section 96 connecting with flat section 92 and convex section 93 connecting with depressed section 96. Further, convex section 93 of second intermediate die 9 corresponds to a part formed by hardening resin 94 filling groove section 86 of first intermediate die 8, and has the same height as the height of flat section 92 of second intermediate die 9.

Wafer Lens Production Step:

FIGS. 5*a* and 5*b* show a method of producing wafer lens 1 with second intermediate die 9. As shown in FIG. 5; resin 4A is dripped onto the upper surface of second intermediate die 9 (a dispensing step), and glass substrate 2 for the wafer lens is positioned over second intermediate die 2 to be in a sucked and stationary condition.

After that, second intermediate die 9 is moved upward toward glass substrate 2 arranged an upward position, and resin 4A is pressed against glass substrate 2 (an imprinting step). At that time, second intermediate die 9 is stopped so as to form a constant gap S3 between each of flat section 92 and convex section 93 of second intermediate die 9, and glass substrate 2, in order to prevent flat section 92 and convex section 93 of second intermediate die 9 from hitting the bottom surface of glass substrate 2.

Then, while the height of second intermediate die 9 is kept as it is, resin 4A filling molding section 91 is irradiated with light from an upper position of glass substrate 2 to harden resin 4A with light (an exposure step). After the irradiation, second intermediate die 9 is moved down. Thereby, resin 4A is removed from second intermediate die 9 (a die-releasing step). As the result, as shown in FIG. 5b, there is formed wafer lens 1 including convex lens section 11 on the bottom surface of glass substrate 2.

Around convex lens section 11 of wafer lens 1 which has been produced, peripheral section 17 including flat section 12 and convex section 13 is formed to connect with convex section 11. Further; the height of flat section 12 of wafer lens 1 measured from the bottom surface of glass substrate 2 is represented by $\Delta H$, which is the same as gap $\Delta H$ conventionally required for preventing the hitting problems caused in one molding process and is half of $2\Delta H$ which is the height of flat section 12G of a conventional wafer lens 1 in FIG. 30b from the bottom surface of glass substrate 2G.

Next, production apparatus 10 used for producing the above wafer lens 1 will be described. Hereinafter, the apparatus used for the situation that first intermediate die 8 is molded with die 7 as shown in FIGS. 3a and 3b. However, also for the situation that second intermediate die 9 is produced with first intermediate die 8 and the situation that wafer lens 1 is produced with second intermediate die 9, the same production apparatus can be used.

As shown in FIG. 6 and FIG. 7, production apparatus 10 mainly includes surface plate 20 in a rectangular parallelepiped shape, XY stage 30 arranged on surface plate 20, X-axis transfer mechanism 100 for moving XY stage 30 along the X-axis direction, and a pair of Y-axis transfer mechanisms 200 for moving XY stage 30 along the Y-axis direction.

As shown in FIG. 7 and FIG. 8, X-axis transfer mechanism includes X-axis guide 102 running in the X-axis direction. As shown in FIG. 5, XY stage 30 is arranged below X-axis guide 102. On XY stage 30, a pair of ridge sections 31 running in the X-axis direction is formed, and X-axis guide 102 is arranged between ridge sections 31.

As shown in FIG. 8, X-axis transfer mechanism 100 includes linear motor 110 for transferring XY stage 30 actually along the X-axis direction. Linear motor 110 has a known structure mainly composed of stationary member 112, movable member 114, scale 116 and sensor 118. Stationary member 112 is fixed on X-axis guide 102.

Movable member 114 is fixed on one of ridge sections 31 of XY-stage 30 and is movable along X-axis guide 102. Scale 116 is fixed on X-axis guide 102. Sensor 118 is fixed on the other of ridge sections 31 of XY-stage 30.

In X-axis transfer mechanism 100, movable member 114 moves along stationary member 112 while sensor 118 detects scale 116. Thereby, XY-stage 30 can be transferred in the X-axis direction by a prescribed distance along X-axis guide.

Air slide guide mechanism 120 is arranged on each of ridge sections 31 of XY-stage 30. Air slide guide mechanism 120 includes exhaust vent 122 for exhausting air. Air slide guide mechanism 120 exhausts air from respective exhausting vents 122 against X-axis guide 102, so as to slide XY-stage 30 along the guide.

In the lower portion of XY-stage 30, plural air slide guide mechanisms 130 are deposited. Each of air slide guide mechanisms 130 includes two exhausting vents 132, 136 for exhausting air and one vacuum vent 134 for sucking air. Air slide guide mechanism 130 sucks air through vacuum vent 134 while exhausting air through exhausting vents 132, 136, so as to flow and move XY-stage 30 on surface plate 20 to keep a constant position in height.

As shown in FIG. 6 and FIG. 7, Y-axis transfer mechanism 200 includes a pair of Y-axis guides 202 running along the Y-axis direction. On each Y-axis guide 202, a pair of Y-axis movable bodies 210 are arranged.

On Y-axis movable bodies 210, both ends of X-axis guide 102 are fixed. Y-axis movable bodies move in the Y-axis direction along Y-axis guides 202 with supporting X-axis guide 102 (XY-stage 30).

Concretely, linear motor 210 is arranged on Y-axis transfer mechanism 200. Similarly to the structure of linear motor 110 of X-axis transfer mechanism 100, linear motor 210 mainly includes stationary member 222, movable member 224, scale 226 and a sensor (which is not illustrated). While the sensor detects scale 226, movable member 225 moves along stationary member 222. Thereby, Y-axis movable body 210 becomes movable in the Y-axis direction along Y-axis guide 202 by a prescribed distance.

As shown in FIG. 9, hook sections 212, 214 in a hook shape are formed at the ends of Y-axis movable body 210. End sections 204, 206 are recessed inside the respective hook sections 212, 214 so as to be fitted with the respective hook sections 212, 214.

Air slide guide mechanism 230 is arranged on hook section 212, and air slide guide mechanism 240 is arranged on hook section 214. Air slide guide mechanism 230 includes exhausting vents 232, 234, 236 for exhausting air from three directions (the upward direction, the lateral direction, and the downward direction). Air slide guide mechanism 240 also includes exhausting vents 242, 244, 246 for exhausting air from three directions (the upward direction, the lateral direction, and the downward direction).

Air slide guide mechanism 230 exhausts air from exhausting vents 232, 234, 236 toward end section 204 of Y-axis guide 202, and air slide guide mechanism 240 exhausts air from exhausting vents 242, 244, 246 toward end section 206 of Y-axis guide 202, so as to air-slide Y-axis movable body 210.

As shown in FIG. 6 and FIG. 7, there are arranged dispenser 32 for dripping resin on die 7, laser distance measuring instrument 34 for measuring flatness (inclination) and a position in the height direction of die 7, die 7, and microscope 36 for use in an alignment process of first intermediate-die substrate on XY-stage 30.

As shown in FIG. 6, on XY-stage 30, there is formed though hole 40 penetrating between the upper surface and bottom surface and having a round shape viewed on a plane. First intermediate-die substrate 80 is arranged to face through hole 40.

Concretely, a step is formed in through hole 40 and first intermediate-die substrate 80 is fixed there with an un-illustrated spring. On XY-stage 30, lid section 42 having a rectangular shape viewed in a plane is arranged so as to cover through hole 40. Lid section 42 is composed of a member with optical transparency such as a quartz plate, and light source 44 is arranged above the lid section 42.

As shown in FIG. 10, in surface plate 20, die section 50 and Z-axis transfer mechanism 300 for moving die section 50 along the Z-axis direction are embedded. Die section 50 is arranged on the top of Z-axis transfer mechanism 300 (Z-stage 304).

Z-axis transfer mechanism 300 mainly includes Z-axis guide 302 in a shape of a rectangular tube having a flange at the upper portion, Z-stage 304 for moving Z-axis guide 302 in the Z-axis direction, and motor 305 for moving X-stage 304 in the Z-axis direction (the vertical direction).

Motor 306 houses a potentiometer therein, and shaft 308 is connected with the motor. In Z-axis transfer mechanism 300, shaft 308 is elongated and shortened in the vertical direction by the movement of motor 306. Corresponding to that, Z-stage 304 and die section 50 moves in the vertical direction.

As shown in FIG. 11a, gap 310 is arranged between the inner-circumference surface of Z-axis guide 302 and the side surface of Z-stage 304.

Air slide guide mechanism 320 is arranged on Z-axis guide 302. Air slide guide mechanism 320 includes exhausting vents 322, 324, 326, 328 for exhausting air. Air slide guide mechanism 320 is configured to air-slide Z-stage 304 by exhausting air through exhausting vents 322, 324, 326, 328 toward Z-stage 304.

As shown in FIG. 10, the inner circumference surface forming a flange of Z-axis guide 302 is sealed with sealing member 330 such as silicon grease, oil seal and an O-ring, and a space between Z-axis guide 302 and Z-stage 304 is sealed to preventing the air in gap 310 from leaking (coming out) toward an upper side of Z-axis guide 302.

It is more preferable for obtaining the above effect that a flange section is arranged around Z-stage 304 moving vertically and that a space between the flange section and a flange section of Z-axis guide 302 which is stationarily arranged is covered by metal bellows made of metal to seale the space, similarly, which is not illustrated.

As shown in FIG. 10, XY-stage 30, surface plate 20, and Z-axis guide 302 form a housing whose upper surface is opened. Then, by covering the opening on the upper surface of the housing, space 400 is formed in an area enclosed by lid section 42, XY-stage 30, surface plate 20, and Z-axis guide 302. Space 400 is divided by first intermediate-die substrate 80 arranged on XY-stage 30 into upper space 402 formed between first intermediate-die substrate 80 and lid section 42, and bottom space 404 formed between first intermediate-die substrate 80 and Z-axis transfer mechanism 300.

Connection holes 3 are formed at the periphery of the first intermediate-die substrate 80, where connecting holes 3 penetrate between the upper surface and the bottom surface and connect upper space 402 and bottom space 404, which provides a structure in which there is no pressure difference of the both spaces 402, 404. Bottom space 404 is connected with decompression mechanism 410 such as a vacuum pump, and working of decompression mechanism 410 brings space 400 into a decompressed condition.

In place of connection holes 3 formed on first intermediate-die substrate 80, for example, connection holes 38 may be formed on XY-stage 30 as shown in FIG. 10.

Decompression mechanism 410 is connected with bottom space 404, but may be connected with upper space 402.

As shown in FIG. 12, die section 50 mainly includes first support 52, piezo actuators 54, second support 56, pressure sensor 58, third support 53 and die 7 (alternatively, first intermediate die 8 or second intermediate die 9, which are not illustrated) which are arranged in this order on Z-stage 304.

First support 52 and second support 56 are joined and biased with screw 66 for pre-compression so as to approach each other. Three piezo actuators 54 and L-shaped leaf spring 68 are arranged between the first support 52 and second support 56 (see FIG. 13). Second support 56 and third support 60 are connected with screw N and pressure sensor 58 is arranged between second support 56 and third support 60. θ-stage 62 for rotating die 7 is arranged between third support 60 and die 7.

As shown in FIG. 13, three piezo actuators 54 are arranged at three corners first support 2 and second support 56 is supported at the three points. Die section 50 controls working of respective piezo actuators 54 based on an output value of pressure sensor 58 to adjust the inclement of second support 56, first support 60 and die 7. As the result, it allows performing a correction of parallelism of die 7 and first intermediate-die substrate 80, and performing die closing and transfer molding with controlling a load to resin to be a desired pressure after die 7 is filled with the resin. In the present example, there are provided three piezo actuators, but the number of actuators does not limited to that as far as their arrangement and number are suitable to control the load.

In die 7, there are formed molding section 71 in a concave shape, flat section 72 connecting with molding section 71, depressed section 73 arranged to further connecting with flat section 72, as shown in above described FIG. 3a (where they are simplified in FIG. 12). The surface (molding surface) shape of molding section 71 becomes a negative shape corresponding to convex section 11 in wafer lens 1.

As shown in FIG. 14, dispenser 32 includes needle section 33 for dripping resin, and needle section 33 penetrates XY-stage 30. Under the condition that dispenser 32 of XY-stage 30 and die section 50 are arranged to face each other, space 406 is formed in an area surrounded by XY-stage 30, surface plate 20, and Z-axis transfer mechanism 300, and the tip of needle section 3 of dispenser 32 is arranged in space 406. Under the condition, space 406 is brought into a decompression condition by working of decompression mechanism 410.

Because the other structures in FIG. 14 are same as those in FIG. 10, the similar structural parts are labeled by the same signs and their descriptions are eliminated.

Production apparatus 10 including the above structures further includes control device 500. The following members are connected with control device 500: dispenser 32, laser distance measurement instrument 32, microscope 36, light source 44, die section 50 (piezo actuators 54, pressure sensor 58 and θ-stage 62), X-axis transfer mechanism 100, Y-axis transfer mechanism 200, Z-axis transfer mechanism 300, air slide guide mechanisms 120, 130, 230, 240, 320, and decompression mechanism 410. Control section 500 is configured to receive detecting results of those members and control their actions (such as start and stop).

When second intermediate die 9 is produced in the above production apparatus 10, the apparatus can be used by replacing die 7 with first intermediate die 8 and replacing first intermediate-die substrate 80 with second intermediate-substrate die 90. When wafer lens 1 is produced, the apparatus can be used by replacing die 7 with second intermediate die 9, and replacing second intermediate-die substrate 90 with glass substrate 2 for a wafer lens.

Next, working of the above production apparatus 10 will be described in reference with FIG. 16 and FIG. 17. Also in this case, it will be described by using an example of a case that first intermediate die 8 is produced (first intermediate die production step).

At first, first intermediate substrate 80 is arranged on XY-stage 30 (wafer loading step S1), through hole 40 of XY-stage 30 is covered with lid section 42 (see FIG. 10). On the bottom surface of first intermediate-die substrate 80, above-described depressed section 85 has been formed previously.

After that, by controlling X-axis transfer mechanism 100 (linear motor 110), Y-axis transfer mechanism 200 (linear motor 220) and air slide guide mechanisms 120, 130, 230, 240, XY-stage 30 is sled in the X-axis direction and the Y-axis direction and is positioned such that dispenser 32 is located over die 7 (pre-alignment step S2).

In this case, an alignment mark has been formed previously at a prescribed position of surface plate 20. In the pre-alignment step, dispenser 32 is positioned while the alignment mark is observed by microscope 36.

When the positioning of dispenser 32 is completed, working of at least air slide guide mechanism 130 is stopped to brings the condition that XY-stage 30 and surface plate 20 are tightly touched with each other, and a prescribed amount of resin is dripped on die 7 of die section 50 from needle section 33 of dispenser 32 (dispensing step S3, see FIG. 3a and FIG. 14).

At that time, as shown by solid lines in FIG. 17, decompression mechanism 410 is controlled to decompress space 406. The decompression basically means that a vacuum condition is formed in decompress space 406, which is defined by $10^{-2}$ MPa or lower concretely.

Performing dispensing step S3 under the decompression condition can prevent bubbles from being blended in resin 84A.

In the present embodiment, the operation from dispensing step S3 to die-releasing step S5 is performed under the decompression condition. The decompression is defined according to the above descriptions.

After that, by controlling X-axis transfer mechanism 100 (linear motor 110), Y-axis transfer mechanism 200 (linear motor 220) and air slide guide mechanisms 120, 130, 230, 240, XY-stage 30 is sled with air in the X-axis direction and the Y-axis direction and is positioned such that first intermediate-due substrate 80 which has been arranged previously thereon locates above die 7 of die section 50 (alignment step S4, see FIG. 10).

After that, the following processes are performed.

(1) As shown in FIG. 18, known laser distance measurement instrument 34 is arranged right over die 7. Working of air slide guide mechanisms 120, 130, 230, 240 is stopped, and first intermediate-die substrate 80 is fixed at the position to be under the condition that XY-stage 30 and surface plate 20 tightly touch each other.

At the same time, air slide guide mechanism 320 is controlled to exhaust air, for example, just from exhausting vents 322, 328 as shown in FIG. 11b, and to make a part of Z-stage 304 touch with the inner wall of Z-axis guide 302. Thereby, the position of die section 50 can be fixed (adjusted) and the position of die section 50 can be kept at a certain position with friction caused between Z-stage 304 and Z-axis guide 302.

(2) After that, the heights of three or more points are measured with a laser distance measurement instrument. The inclination of the upper surface of the die and the position of the die in the height direction are calculated from the result, and piezo actuators 54 are controlled based on the outputted values (a shift value of angle α) to make the bottom surface of first intermediate-die substrate 80 and the upper surface of the die parallel with each other.

The fixed condition is released, and a microscope is arranged right over die 7. Working of air slide guide mechanisms 120, 130, 230, 240 is stopped and the first intermediate-die substrate 80 is fixed at its position to be under the condition that XY-stage 30 and surface plate 20 tightly touches each other.

At the same time, air slide guide mechanism 320 is controlled to exhaust air; for example, just from exhausting vents 322, 328 as shown in FIG. 11b, and to make a part of Z-stage 304 touch with the inner wall of Z-axis guide 302. Thereby, the position of die section 50 can be fixed (adjusted) and the position of die section 50 can be kept at a certain position with friction caused between Z-stage 304 and Z-axis guide 302.

As described above, by making guide 302 and Z-stage 304 touch each other, the die to be attached on them can be held always at the fixed position and the fixed angle with respect to the guide. As the result, the stage or die can smoothly move in the released condition, and molding operations can be performed repeatedly at the same orientation with that in the adjusting process, in the fixed condition, which is advantageous.

(3) After that, the die is detected with microscope 36 and the actual arranged position of die 7 is obtained based on the detected result Corresponding to the actual arranged position, coordinates of axes of die 7 at the initial position, which has been previously set in control section 500 as coordinates of axes, are transformed.

Concretely, at least two positions are observed with microscope from an upper position of die 7. One of the positions is observed as the origin and the other is observed as a correction point. For example, alignment marks has been previously arranged at diagonal positions on die 7, and one of the alignment marks is observed as the origin and the other is observed as a correction point. In the present embodiment, microscope 36 is used as an example of a position detecting device for detecting the arranged position of die 7.

After that, a straight line for a coordinate transformation, extending from the origin toward the correction point is calculated. Then, a difference (difference amount of angle θ) of the calculated line and the axis coordinates which have been previously set is calculated. Based on the difference, the coordinates of axis are transformed. In other words, the arrangement position of die 7 has been previously set in control device 500 as axis coordinates, and the difference between the axis coordinates which have been set and the line for the coordinate transformation calculated after the observation with microscope 36. As shown in FIG. 19, axis coordinates (see dotted liens) which have been previously set is transformed into the axis coordinates (see solid lines) calculated from the difference. Thereby, the two-dimensional relationship of relative positions of die 7 and first intermediate-die substrate 80 can be fixed, and movement of first intermediate-die substrate 80 with respect to die 7 can be performed with accuracy.

Alternatively, θ-stage 62 (see FIG. 12) for rotating die 7 may be provided in die section 50, and die 7 may be rotated and moved such that die 7 corresponds to the axis coordinates which has been previously set by controlling θ-stage 62 (that is, displaced axis coordinates may be returned to the ordinal condition), in place of the above transformation of axis coordinates by control device 50.

Under the condition, the position of die section 50 is controlled to move die 7 up to the prescribed position with respect to first intermediate-die 80, and die 7 is held at the prescribed position (imprinting step S5).

Concretely, Z-axis transfer mechanism (motor 306) is started to extend shaft 308 upward and to move Z-stage 304 upward.

At that time, based on the outputted value of a potentiometer housed in motor 306, working of motor 306 is controlled, to move Z-stage 304 to the prescribed position in the height direction. As the result, resin 84A is pressed by first intermediate-die substrate 80 and gradually expands, to fill molding section (sections) 71 of die 7.

Also in imprinting step S5, space 400 has been previously decompressed by controlling decompression mechanism 410.

Pressing resin 84A with first intermediate-die substrate 80 under the decompressed condition can prevent bubbles from being blended in resin 84A. Further, since space 400 has been brought into the decompressed condition, there is no pressure difference caused between upper space 402 and bottom space 404 and first intermediate-die substrate 80 can be prevented from bend and deformation.

After that, light source 44 is controlled and resin 84A is irradiated with light to be hardened while Z-stage 304 is held at the set position (exposure step S6).

At that time, since space 400 has been brought into a decompressed condition by controlling decompression mechanism 410, interruption in an oxygen supply to resin 84A can be prevented and resin 84A can be surely hardened.

Under the condition that Z-stage 304 is kept to be held at the prescribed position in the height direction when resin 84A is hardened (at the time of or hardening of the resin 84A or after hardening of the resin 84A), when hardening and shrinking are caused in resin 84A, first intermediate-die substrate 80 does not follow the shrinking of resin 84A, which can cause a distortion inside the resin 84A and can transfer the surface shape of molding section 71 to resin 84A insufficiently.

Therefore, by lighting light source 44 for a certain period, resin 84A is irradiated with a certain amount of light. Then, the pressure die section 50 is controlled to maintain the pressing power of die 7 against first intermediate-die substrate 80 to be a prescribed pressure power.

Concretely, piezo-actuator 54 is operated based on the outputted value of pressure sensor 58 to move die 7 upward.

After that, light source 44 is turned off and light irradiation for resin 84A is stopped. After the stop of the light irradiation, motor 306 is operated to shorten shaft 308 downward and Z-stage is moved downward. Thereby, hardened resin 84A is released from die 7 together with first intermediate-die substrate 80 (die-releasing step S7).

At that time, decompressing mechanism 410 is controlled to bring space 400 into a decompressed condition, which avoids applying atmospheric pressure to the space and allows easy releasing of the die. As the result, molding section (sections) 81 of first intermediate-die substrate 80 corresponding to molding section (sections) 71 of one die 7 is formed on first intermediate-die substrate 80.

After that, dispensing step S3, imprinting step S5, exposure step S6 and die-releasing step S7 are repeated prescribed times, and plural molding sections 71 are further formed sequentially on first intermediate-die substrate 80 (see FIG. 1 and FIG. 2), to produce first intermediate die 8 (see FIG. 3*b*).

Then, after the prescribed number of molding sections 71 are formed on first intermediate-die substrate 80, air slide guide mechanisms 120, 130, 230, 240, 320 are operated to move XY-stage 30 and Z-stage 304 to the prescribed positions. Finally, lid section 42 is removed from XY-stage 30 and first intermediate-die substrate 80 is taken out (taking out step S8).

When the production of first intermediate die 8 is completed as described above, the die 7 is subsequently replaced with first intermediate die 8, first intermediate die 8 is replaced with second intermediate die 90, and the above steps S1 to S8 are performed to produce intermediate die 90. Further, after the production of second intermediate die 9 is completed, the first intermediate die 8 is subsequently replaced with second intermediate die 9, second intermediate die 9 is replaced with glass substrate 2 for a wafer lens, and the above steps S1 to S8 are performed to produce wafer lens 1.

As described above, in the present embodiment, there has been formed depressed section 85 at a position in the bottom surface of first intermediate-die substrate 80 in the first intermediate die production step, where the position in the bottom surface of first intermediate-die substrate 80 faces top section 71*a*, flat section 72 and a part of depressed section 73 in die 7. When photo-curable resin 84A which filling the space between die 7 and first intermediate-die substrate 80 is pressed, flat section 72 closest to intermediate-die substrate 80 in resin section 4 of die 7 is arranged within depressed section 85, and prescribed gap S1 is arranged such that the flat section 72 does not to touch with depressed plane 85*a* forming depressed section, which can prevent die 7 from hitting first intermediate-die substrate 80. Further, in comparison with the case that depression section 85 is not formed on first intermediate-die substrate 80, die 7 can approach first intermediate-die substrate 80, which prevents resin section 84 such as molding section 81 and peripheral section 87 in first intermediate die 8 from being excessively thick and downsizes first intermediate die 8. Further, wafer lens 1 produced with such first intermediate die 8 can be achieved to be downsized.

[Second Embodiment]

Second embodiment shows the case that a depressed section is further formed on a glass substrate of a wafer lens, which is different from First Embodiment.

FIG. 20 shows the case that an optical surface of wafer lens 1B is in a convex shape. Depressed section 15B is formed on the bottom surface of glass substrate 2B at the position facing convex lens section 11B, flat section 12 connecting with the convex lens section 11B and a part of convex section 13B. In other words, the area (projection area) formed when the whole of convex lens section 11B is projected onto substrate 2B in the direction parallel with the optical axis of convex lens section 11B, and the area (projection area) formed when the whole of flat section 12B is projected onto substrate 2B are located within depressed section 15B. Further in the depressed section, flat section 1213 is arranged, and there is provided a prescribed gap between flat section 12B and depressed plane 15*a*B forming depressed section 15B.

On the other hand, FIG. 21 shows the case that an optical surface of wafer lens 1C is in a concave shape. Depressed section 15C is formed on the bottom surface of glass substrate 2C at the position facing concave lens section 11C. Within depressed section 15C, as described above, an area (projection area) obtained when the whole of concave lens section 11C is projected onto substrate 2C in the direction parallel with the optical axis of concave lens section 11C, and there is provided a prescribed gap so as to prevent the top of concave lens section 11C from touching depressed surface 15*a*C forming depressed section 15C.

As described above, by arranging depressed section 15B, 15C on glass substrate 2B, 2C of wafer lense 1B, 1C, height Hb, Hc of resin section 4B, 4C measured from the bottom surface of glass substrate 2B, 2C can be lower than height Ha (see FIG. 5*a*) of resin section 4 of First Embodiment and they work for downsizing wafer lens 1B, 1C. Further, when depressed section 15B, 15C is formed on a part of glass substrate 2B, 2C, rather than the thickness of the whole of the glass substrate is reduced, the size reduction can be achieved with maintaining the necessary strength of glass substrate 2B, 2C, which is preferable.

When, under the case that there is provided flat section 12B, 12C formed around convex lens section 11B or concave lens section 11C, there is provided a structure that the area obtained when the whole of convex lens section 11B or concave lens section 11C is projected onto substrate 2B, 2C from the direction parallel with the optical axis is located within depressed section 15B, 15C of substrate 2B, 2C. By providing the structure, a dispensing opening for dispensing resin to lens section 11D from its periphery can be secured to be relatively wider in comparison with the structure that a part of the lens section protrudes from the depressed section, as described below. Therefore, sink marks are hardly generated when lens section 11D is hardened, which is significant especially in the condition that a convex lens section is formed.

[Third Embodiment]

Third Embodiment provides the condition that depressed section 15D is formed on glass substrate 2D of wafer lens 1D, as shown in FIG. 22, similarly to Second Embodiment.

Height Hd of convex section 13D is the same as height Hb of the convex section 13B of Second Embodiment. However, thickness Hd1 of flat section 12D is set to be thicker than thickness Hb1 of flat section 12B of Second Embodiment In this case, when ultraviolet ray is irradiated and convex lens section 11D starts being hardened at the time of hardening and forming convex section 13D with second intermediate die 9, resin is supplied from the periphery through flat section 12D as shown in arrays X, which hardly makes sink marks.

On the other hand, FIG. 23 shows the case which is all the same as FIG. 22 other than the point that depressed section 15D of glass substrate 2D is eliminated. In this case, when flat section 12E becomes especially thin, flat section 12E is hardened first, which easily makes sink marks when convex refractive lens section 11E is hardened.

[Fourth Embodiment]

In Fourth Embodiment, as shown in FIG. 24, ultraviolet absorber is added to resin section 94F of second intermediate die 9 when wafer lens 1F is produced with second intermediate die 9. Further, in Fourth Embodiment, the resin is irradiated with light from the side of second intermediate die 9F. Therefore, flat section 12F of resin section 4F of wafer lens 1F is hardened by ultraviolet ray passing through a thick layer of resin section 94F of second intermediate die 9F, which makes ultraviolet ray for the irradiation weak and elongates the hardening time. On the other hand, the top of lens section 11F of convex refractive lens section 11F and the top of convex section 13F start being hardened earlier because resin section 94F of intermediate die 9F is thin and ultraviolet ray is not almost weakened. Accordingly, before the hardening of the entire areas of convex refractive lens section 11F and convex section 13F is completed, flat section 12 is not hardened, which can prevent sink marks.

[Fifth Embodiment]

Fifth Embodiment will be described below.

As shown in FIG. 1 and FIG. 2, wafer lens 1 comprises glass substrate 2 in a round shape and resin sections 4 formed on one surface of glass substrate 2.

Resin section 4 includes, as shown in FIG. 27c, convex lens sections 11 each becoming a convex optical surface; flange sections 912 being flat and in a ringed shape, arranged around convex lens sections 11 and formed connecting with convex lens sections 11; and depressed sections 913 formed to connect with flange sections 912. Flange section 912 and depressed section 913 are arranged between neighboring convex lens sections 11, 11.

Convex lens section is preferably a refractive lens, but it is not limited to that. On the optical surface, fine structures such as surface diffraction grooves and steps may be formed.

The pitch between convex lens sections 11 is preferably in the range of about 10 μm to 5 mm. Width M of depressed section 913 (see FIG. 25a) is wider than dicing width m (generally, in the range of 0.2 mm to 0.3 mm, see FIG. 27c) in dicing step which will be described later in order to reduce the load of the blade in the dicing processing, and is preferably in the range of about 30 μm to 1 mm.

Resin section 4 is formed of photo-curable resin. As the photo-curable resin, for example, acrylic resin and allyl ester resin can be used. These resins can be hardened by radical polymerization.

Wafer lens 1 is formed in the following way, as shown in FIGS. 25a to 27c. By using array master die 7 including lens molding sections 971 in a negative shape (concave shape) corresponding to optical surface shape of convex lens section 11, first intermediate die 8 including lens molding sections 981 in a positive shape (convex shape) is formed. By using first intermediate die 8, second intermediate die 9 including molding sections 91 in a negative shape (concave shape) is formed. Then, wafer lens 1 is formed by using the resulting second intermediate die 9. In the present embodiment, resin sections 4 (convex lens sections 11 and flange sections 912), where each resin section corresponds to one second intermediate die 9 as a unit, are formed on one glass substrate 2 with a large diameter unit by unit (see arrows in FIG. 1 and FIG. 2). Finally, glass substrate 2 is diced up into pieces each including convex lens section 11 and flange section 912.

Since FIG. 1 and FIG. 2 show a certain stage of the production steps, resin sections 4 are formed only a part of the surface of glass substrate 2. The form of resin sections 4 in FIG. 1 and FIG. 2 has been prepared by simplifying those shown in FIG. 27c for the convenience of preparing the drawings.

Next, a production method of wafer lens 1 will be explained.

Intermediate Die Production Step:

FIGS. 25a to 25d show a producing method of first intermediate die 8 with array master die 7 (hereinafter, referred as die 7). As shown in FIG. 25a, die 7 includes lens molding sections 971 in concaved shape for forming lens molding sections 981 of first intermediate die 8; flange molding sections 972 each having flat and ringed shape and formed around lens molding section 971 to connect with lens molding section 971; and depressed sections 973 each formed to connect with flange molding section 972 and arranged between neighboring lens molding sections 971, 71. An inner wall surface (side wall) forming depressed section 973 is defined as rise surface 73a. Rise surface 73a is an almost perpendicular surface to flange molding section 972.

As a material of die 7, metal or metal glass is preferably used.

Further, it is preferable that die-releasing agent is previously applied on flange molding sections 972 and rise surfaces 73a to enhance the die-releasing characteristic against resin 84A to be dispensed. In the present invention, die-releasing agent is applied on surfaces of flange molding sections 972 and rise surfaces 73a of die 7 at first, to enhance the die-releasing characteristic. In this case, it is preferable to use the way that after a surface modifying treatment is applied to the surfaces of flange molding sections 972 and rise surfaces 73a, prescribed die-releasing agent is applied to enhance the die-releasing characteristic. Concretely, OH radicals are disposed perpendicularly on the surface of die 7. As a method of surface modification, any methods to dispose OH radicals perpendicularly on the surface of die 7, such as a UV/Ozone cleaning and oxygen plasma ashing can be used. As die-releasing agent, there can be cited a material wherein a hydrolysable functional group is linked to the terminal thereof, such as the structure of silane coupling agent, in other words, a material having a structure so as to cause a dehydration condensation or hydrogen bonding against OH radicals existing on metal and to be linked to the OH group. In the case of die-releasing agent such that one terminal has a silane coupling structure and the other terminal has a die-releasing function, when greater amount of OH radicals are formed on the surface of die 7, covalent bonding is caused at broader positions on the surface of die 7, which enables stronger bonding. As the result, even after molding professing is repeated many times, the effect of die releasing is not reduced and the life of the die is elongated. Further, a priming coat (such as an under coating layer and $SiO_2$ coat) is not required, which provides an effect to enhance the life with keeping the thin layer.

As shown in FIG. 25b, resin 84A is dispensed to a space between the first position of first intermediate-die substrate 80 and each of plural lens molding sections 971 of die 7, separately (a dispensing step). Herein, resin 84A is dispensed to the inside of plural lens molding sections 971 of die 7, separately. The dispensing volume of resin 84A is defined to be greater than the space volume T1 (See FIG. 25c) of a space formed between first intermediate-die substrate 80 and each set of lens molding section 971 and flange molding section 972 of die 7. More concretely, the resin is dispensed so as to form a tapered shape when resin 84A is hardened, wherein angle θ1 (see FIG. 25d) formed between the bottom surface of first intermediate-die substrate 80 and hardened resin 84A (rise surface 83a) is in the range of 30° to 45°.

Further, first intermediate-die substrate 80 as a glass substrate is kept above die 7 in a sucked and stationary condition. It is preferable that a treatment such as a plasma treatment and UV/Ozone treatment is applied on the bottom surface of first intermediate-die substrate 80 as a treatment for enhancing the wettability of resin 84A.

After that, as shown in FIG. 25c, die 7 moves up toward first intermediate-die substrate 80 which has been arranged upward, to press resin 84A against first intermediate-die substrate 80 (an imprinting step). Herein, the movement of die 7 is stopped with forming certain gap S1 between the bottom surface of first intermediate-die substrate 80 and flange molding sections 972 of die 7, so as to prevent the bottom surface of first intermediate-die substrate 80 and flange molding sections 972 of die 7 from hitting the other.

Then, with keeping the position in height of die 7 as it is, resin 84A filling lens molding sections 971 is irradiated with light from an upper position of first intermediate-die substrate 80, and resin 84A is hardened (a hardening step). After the light irradiation, die 7 is moved downward. Thereby, resin 84A is removed from die 7 (a die-releasing step). As the result, as shown in FIG. 25d, plural sets of lens molding section 981 and flange molding section 982 are formed at the first position of the bottom surface of first intermediate-die substrate, with being divided with depressed sections 983.

Lens molding section 981 has a positive shape corresponding to an optical surface shape of convex lens section 11 of wafer lens 1. Flange molding section 982 forms a flat and ringed shape surface and is arranged around lens molding section 981 connecting with lens molding section 981. Depressed section 983 is formed between lens forming sections 981, 981, connecting with flange molding section 982. An inner wall surface (side wall) forming depressed section 983 is defined as rise surface 83a. As described above, the wettability is properly provided by applying a die-releasing treatment on flange molding section 972 and rise surface 73a. Further, the resin is dispensed such that the dispensing volume is greater than space volume T1 of a space formed between first intermediate-die substrate 80 and each set of lens molding section 971 and flange molding section 972. Because of them, rise surfaces 83a are formed such that the resin becomes wider from the side of die 7 toward the side of first intermediate-die substrate 80. In other words, rise surface 83a forms a tapered shape. Angle θ1 formed between rise surface 83a and the bottom surface of first intermediate-die substrate 80 is the range of 30° to 50°.

After that, as described above, the dispensing step, imprinting step, hardening step and die-releasing step are performed with die 7 at the second position which is different from the first position, to form plural sets of molding section 981 and flange section 982 are molded, which is not illustrated.

As described above, lens molding sections 981 and flange molding sections 982 are formed successively on first intermediate-die substrate with a large diameter by using die 7 plural times, and a prescribed numbers of lens molding sections 981 and flange sections 982 are molded. Thereby, first intermediate die is produced.

Transfer Die Production Step:

FIGS. 26a to 26c show a method of producing second intermediate die 9 from first intermediate die 8. As shown in FIG. 26a, resin 94A is dispensed to a space between the first position of second intermediate-die substrate as a glass substrate and each of plural lens molding sections 981 of first intermediate die 8, separately (a dispensing step). Herein, the resin is dispensed at a position on the upper surface of second intermediate-die substrate 90, corresponding to lens molding section 981. Also in this case, the dispensing volume of resin 94A is set to be greater than the space volume T2 (see FIG. 26b) of the space formed between second intermediate-die substrate 90 and each set of lens molding section 981 and flange molding section 982.

It is preferable that die releasing agent is previously applied on flange molding sections 982 and rise surfaces 83a to enhance the die-releasing characteristics against resin 94A. Further, when the die releasing agent is applied, it is preferable to perform surface modification of flange molding sections 982 and rise surfaces 83a.

Further, first intermediate die 8 is kept above second intermediate-die substrate 90 to be in the sucked and stationary condition.

After that, as shown in FIG. 26b, second intermediate-die substrate 90 moves up toward first intermediate die 8 which has been arranged at an upper position, to press resin 98A against first intermediate die 8 (an imprinting step). Herein, the movement of second intermediate-die substrate 90 is stopped to form a certain gap S2 between lens molding sections 981 of first intermediate die 8 and the upper surface of second intermediate-die substrate 90, in order to prevent lens molding sections 981 of first intermediate die 8 from hitting the upper surface of second intermediate-die substrate 90.

Then, with keeping the position in height of second intermediate-die substrate 90 as it is, resin 94A which has filled lens molding sections 981 is irradiated with light from the upward direction of second intermediate-die substrate 90, and resin 94A is hardened (a hardening step). After the light irradiation, second intermediate die is moved downward. Thereby, resin 94A is released from first intermediate die 8 (a die-releasing step). As the result, as shown in FIG. 26c, plural set of len molding section 991 and flange molding section 992 are formed at the first position of the bottom surface of second intermediate-die substrate 90 with being divided with depressed sections 993.

Lens molding section 991 has a negative shape corresponding to an optical surface shape of convex lens sections 11 of wafer lens 1, and forms a concave shape. Flange molding section 992 is formed into a flat and ring-shape surface arranged around lens molding section 991 to connect with lens molding section 991. Convex section 993 is formed between lens molding sections 991, 991, connecting with flange molding section 992.

After that, as described above, the dispensing step, imprinting step, hardening step and die-releasing step are performed with first intermediate die 8 at the second position which is different from the first position, and plural sets of lens molding section 991 and flange molding section 992, which is not illustrated.

As described above, by using first intermediate die 9 plural times, lens molding sections 991 and lens molding sections 992 are successively formed on second intermediate substrate 90 with a large diameter, to form a prescribed number of lens molding sections 991 and flange molding sections 992.

Thereby, second molding die 9 is produced.

Wafer Lens Production Step:

FIGS. 27a to 27c show a method of forming wafer lens 1 with second intermediate die 9. As shown in FIG. 27a, resin 4A is dispensed to a space between a first position of glass substrate 2 and each of plural lens molding sections 991 of second intermediate die 9, separately (a dispensing step). Herein, the resin is dispensed to the inside of each of the lens molding sections 991 of second intermediate die 9, separately. Also in this case, the dispensing volume of resin 4A is set to be greater than the space volume T3 (see FIG. 27b) of the space formed between glass substrate 2 and each of lens molding sections 991 and flange molding sections 992 of second intermediate die 9.

It is preferable to apply die releasing agent on flange molding sections 992 and rise surfaces 93a previously to enhance the die-releasing characteristics against resin 4A. Further, when the die releasing agent is applied, it is preferable to perform a surface modification of flange molding sections 992 and rise surfaces 93a.

Further, glass substrate 2 for wafer lens 1 is kept above second intermediate die 9 to be in sucked and stationary condition.

After that, as shown in FIG. 27b, second intermediate die 9 is moved up toward glass substrate 2 which has been positioned at an upper position, to press resin 4A against glass substrate 2 (an imprinting step). Herein, the movement of second intermediate die 9 is stopped to form a constant gap S3 between the bottom surface of glass substrate 2 and convex sections 993 of second intermediate die 9 in order to prevent the bottom surface of glass substrate 2 and convex sections 993 of second intermediate die 9 from hitting the other.

Then, with keeping the position in height of second intermediate die 9 as it is, resin 4A which has filled lens molding sections 991 is irradiated with light from an upper position of glass substrate 2, and resin 4A is hardened (a hardening step). After the light irradiation, second intermediate die 9 is moved down. Thereby, resin 4A is released from second intermediate die 9 (a die-releasing step). As the result, as shown in FIG. 27c, plural sets of convex lens section 11 and flange section 912 are formed at the first position of glass substrate 2 with being divided by depressed sections 913.

After that, as described above, the dispensing step, imprinting step, hardening step and die-releasing step are performed with second intermediate die 9 at a second position which is different from the first position of glass substrate 2, to form plural sets of lens section 11 and flange section 912, which is not illustrated.

As described above, by using second intermediate die 9 plural times, convex lens sections 11 and flange sections 912 are formed on glass substrate 2 with a large diameter successively, to form a prescribed number of convex lens sections 11 and flange section 912 are formed. Thereby, wafer lens 1 is produced.

Finally, by dicing up glass substrate 2 at positions of depressed sections 913, it is separated into pieces each including a set of convex lens section 11 and flange section 912 (a dicing step).

After first intermediate die 8 is produced by the above way, the above-described die 7 is replaced with second intermediate-die substrate 90, first intermediate-die substrate 80 is replaced with first intermediate die 8, and the above steps S1 to S8 are performed. Thereby, second intermediate die 9 is produced. After the second intermediate die 9 is produced, the first intermediate die 8 is replaced with glass substrate 2, second intermediate-die substrate 90 is replaced with second intermediate die 9, and the above steps S1 to S8 are performed similarly. Thereby, wafer lens 1 is produced.

As described above, according to the present embodiment, a die-releasing treatment is applied to flange molding sections 972 and rise surfaces 73a of die 7, which allows easy releasing of die 7 from resin 84A.

In the dispense step of the production of first intermediate die 8, the dispensing volume of resin 84A to be dispensed to a space between first intermediate-die substrate 8 and each set of lens molding section 971 and flange molding section 972 is greater than the space volume T1 of a space formed between first intermediate-die substrate 8 and each set of lens molding section 971 and flange molding section 972. When the dispensing volume of resin 84A becomes smaller than space volume T1, sink marks can be easily generated because of shrinking when resin 84A is hardened which deforms resulting first intermediate die 8. As the result, when this first intermediate die 8 is used to form second intermediate die 9 and wafer lens 1 as the succeeding step, it can affect their shapes. However, in the present invention, the dispensing volume is set to be greater than space volume T1, which avoids the above problem and enables to produce first intermediate die 8 in an excellent shape. Then, it makes the shapes of second intermediate die 9 and wafer lens 1 which will be formed from first intermediate die 8 excellent.

Die 7 has a structure that plural sets of lens molding section 971 and flange molding section 972 are divided through depressed sections 973, and that rise surface 73a is arranged between each flange molding section 972 and depressed section 973. Thereby, resin 84A is hardened to form a tapered shape whose width becomes wider toward the side of first intermediate-die substrate 80, which prevents bodies of resin 84A dispensed to neighboring lens molding sections 971, 71 from being hardened in a connected condition. Further, because resin 84A is hardened to form a tapered shape such that the width of the resin becomes broader toward the side of first intermediate-die substrate 80, the die-releasing characteristic against die 7 becomes excellent.

Further, even when the dispensing amount is excessively increased and resin 84 is hardened with being jointed with resin 84 inside neighboring lens molding sections 971, air can be vented through depressed section 973. In other words, in the condition that depressed sections 973 are not formed, bodies of resin 84A inside neighboring lens molding sections 971, 71 can be perfectly connected with each other. However, depressed section 973 can prevent that.

Further, by arranging depressed sections 973 on die 7, positions (depressed sections 913) of wafer lens 1, corresponding to depressed section 973 become thin, which makes the dicing process easy.

In the dispensing step of the production of first intermediate die 8, the resin is dispensed such that the hardened resin 84A forms a tapered shape to form an angle between the bottom surface of first intermediate-die substrate 80 and hardened resin 84A being in the range of 30° to 40°, which provides an excellent die-releasing characteristics between hardened resin 84A and die 7.

Because width M of depressed section 973 formed on die 7 is broader than dicing width m, wafer lens is not required to be diced up at the positions on flange sections 912, and wafer lens 1 of a desired size can be obtained.

In the dispensing step of the production of first intermediate die 8, resin 84A is preferably dispensed to the side of the molding die among the side of a molding die (die 7) and the side of a substrate (first intermediate-die substrate 80).

As the substrate, a glass substrate is generally used. When the resin is dispensed to the substrate side, the wettability of the glass substrate is required to be better than that of the die, in order to avoid generation of under cutting. Under the condition that the resin is dispensed to a glass substrate with good wettability, the resin can expand, neighboring bodies of the resin can be connected with each other, and the resin can flows into unnecessary areas when the molding die is pressed. Further, under the condition that, for example, convex surface shape is formed with the expanded a thin resin, the resin cannot go to the height of the center of the optical surface and bubbles can be generated. Under the condition that the glass substrate has an excellent wettability, dispensed resin is deformed into a flat shape, which is difficult to form a thick lens shape. In other words, it causes a disadvantage that a lens shape to be formed is restricted.

As descried above, because resin 84A is dispensed onto die 7, a lens shape to be formed is less restricted and a viscosity of the resin to be dispensed is less restricted in comparison with the case that resin 84A is dispensed onto first intermediate-die substrate 80, and above-described problems that unnecessary resin goes to the periphery of a molding die and that bubbles are generated.

Those matters mean that the substrate is preferably positioned at a perpendicularly upper position and the molding die is preferably positioned at a lower position.

The present invention is not limited to the above embodiments and changes and variations may be made without departing from the spirit of scope of the invention.

REFERENCE SIGNS LIST

1, 1B Wafer lens
2, 2B Glass substrate
4 Resin section
4A Resin
11, 11B Convex lens section
11C Concave lens section
11D, 11E, 11F Convex refractive lens section
11a Top Section
12, 12B Flat section
13, 13B Convex section
15B Depressed section
17 Peripheral section
7 Die
71 Molding section
71a Top section
72 Flat section
73 Depressed section
77 Peripheral section
8 First intermediate die
80 First intermediate-die substrate
81 Molding section
82 Flat section
83 Convex section
84 Resin section
84A Resin
85 Depressed section
85a Depressed plane
86 Groove section
87 Peripheral section
9, 9F Second intermediate die
90 Second intermediate-die substrate
91 Molding section
92 Flat section
93 Convex section
94, 94F Resin section
94A Resin
96 Depressed section
97 Peripheral section

The invention claimed is:

1. A production method of a wafer lens in which a plurality of lens sections formed of photo-curable resin are arranged on at least one surface of a substrate, the production method comprising:

a first intermediate die production step of producing a first intermediate die including a lens section having a positive shape corresponding to an optical surface shape of the lens sections of the wafer lens, by filling a space between a die and a first intermediate-die substrate with photo-curable resin and pressing the photo-curable resin, and by hardening the photo-curable resin with light irradiation, where the die includes a molding section having a negative shape corresponding to the optical surface shape of the lens sections, wherein the first intermediate die production step comprises the following sub-steps i) to vii):

i) preparing the first intermediate-die substrate,
ii) filling the molding section of the die with photo-curable resin by dispensing the photo-curable resin to the die and by pressing a first area being a part of a surface of the first intermediate-die substrate against the die,
iii) hardening the photo-curable resin by irradiating the photo-curable resin which has filled the molding section with light,
iv) releasing the die from the photo-curable resin after the hardening,
v) filling the molding section of the die with photo-curable resin by dispensing the photo-curable resin to the die which has been released and by pressing a second area arranged to be separated at a predetermined interval from the first area in the first intermediate-die substrate against the die,
vi) hardening of the photo-curable resin by irradiating the photo-curable resin which has filled the molding section with light, and
vii) releasing the die from the photo-curable resin after the hardening;

a second intermediate die production step of producing a second intermediate die including a molding section having a negative shape corresponding to the optical surface shape of the lens sections of the wafer lens, by filling a space between the first intermediate die obtained in the first intermediate die production step and a second intermediate-die substrate which is different from the first intermediate die, with photo-curable resin, and pressing the photo-curable resin, and by hardening the photo-curable resin with light irradiation; and a wafer lens production step of producing the wafer lens including a plurality of the lens sections, by filling a space between the second intermediate die and the substrate with photo-curable resin, and pressing the photo-curable resin, and by hardening the photo-curable resin with light irradiation, wherein a depressed section is formed on a surface of the first intermediate-die substrate, facing the die, where the depressed section is configured such that at least a portion which is closer to the first intermediate-die substrate than the other among a top of the molding section of the die and a peripheral section connecting with the molding section of the die is arranged in the depressed section, and when the photo-curable resin filling the space between the die and the first intermediate-die substrate is pressed, the portion which is closer to the first intermediate-die substrate than the other among the top of the molding section and the peripheral section of the die is arranged inside the depressed section and a gap is arranged so as to prevent the portion which is closer to the first intermediate-die substrate than the other among the top of the molding section and the peripheral section of the die from touching a depressed plane forming the depressed section.

2. The production method of a wafer lens of claim 1, wherein in the wafer lens production step, a depressed section is formed on a surface of the substrate, facing the second intermediate die, where the depressed section is configured such that at least a portion which is closer to the substrate than the other among a top of the molding section of the second intermediate die and a peripheral section connecting with the molding section of the second intermediate die is arranged in the depressed section, and when the photo-curable resin filling the space between the second intermediate die and the substrate is pressed, the portion which is closer to the substrate than the other among the top of the molding section and the peripheral section of the second intermediate die is arranged inside the depressed section, and a gap is arranged so as to prevent the portion which is closer to the substrate than the other among the top of the molding section and the peripheral section of the second intermediate die from touching a depressed plane forming the depressed section.

3. The production method of a wafer lens of claim 1, wherein each of a molding section of the second intermediate die and a peripheral section connecting to the molding section of the second intermediate die comprises a substance having a function to absorb light with a predetermined wavelength for hardening the photo-curable resin of the lens sections of the wafer lens.

4. An intermediate die for use in a production of a wafer lens in which a plurality of optical components formed of photo-curable resin are arranged on at least one surface of a substrate, the intermediate die comprising:

an intermediate-die substrate formed of glass; and a molding section formed of resin arranged on the intermediate-die substrate and having a positive shape or a negative shape corresponding to an optical surface shape of the optical components, wherein a depressed section is formed on the intermediate-die substrate, where the depressed section is configured such that at least a portion which is closer to the intermediate-die substrate than the other among a top of the molding section and a peripheral section connecting with the molding section is arranged in the depressed section, and the portion which is closer to the intermediate-die substrate than the other among the top of the molding section and the peripheral section is arranged inside the depressed section, and a gap is arranged so as to prevent the portion which is closer to the intermediate-die substrate than the other among the top of the molding section and the peripheral section from touching a depressed plane forming the depressed section.

5. The intermediate die of claim 4, wherein each of the molding section and the peripheral section connecting to the molding section comprises a substance having a function to absorb light with a predetermined wavelength for hardening the photo-curable resin of the optical components.

6. An optical component comprising a substrate and a resin molded section formed by hardening photo-curable resin on at least one surface of the substrate, where a part of the resin molded section includes a concave or convex refractive lens section, wherein:

at least one surface of the substrate comprises a depressed section, the resin molded section comprises the concave or convex refractive lens section and a resin flat section connecting with the concave or convex refractive lens section, on a surface on which the depressed section is formed in the substrate, the refractive lens section is configured such that an area obtained when the concave or convex refractive lens section is projected onto the substrate in a direction parallel with an optical axis is located within the depressed section of the substrate, and the resin molded section is formed continuously and integrally at a step of an edge of the depressed section.

7. The optical component of claim 6, wherein the refractive lens section is a convex refractive lens section, and the resin molded section comprises a molded section arranged around the resin flat section and formed to project more than a highest position of the refractive lens section in a direction of an optical axis.

8. The optical component of claim 6, being prepared by cutting a wafer lens on which a plurality of the concave or convex refractive lens sections of the resin molded section so as to separate the concave or convex refractive lens sections independently.

9. A production method of a molding die for producing a molding die formed of curable resin on a substrate by using a die a plurality of times, wherein, in the die, a plurality of sets of a lens molding section and a flange molding section connecting with a periphery of the lens molding section are divided into sections by depressed sections, the production method comprising:

a dispensing step of dispensing curable resin to a space between a first position of the substrate and each of the plurality of sets of the lens molding section and the flange molding section which are formed on the die, separately;

a hardening step of hardening the curable resin between the die and the substrate after the dispensing step;

a die-releasing step of releasing the die from the curable resin after the hardening step;

a dispensing step of dispensing curable resin to a space between a second position of the substrate and each of the plurality of sets of the lens molding section and the flange molding section which are formed on the die, separately, where the second position is a different position from the first position;

a hardening step of hardening the curable resin between the die and the substrate after the dispensing step; and a die releasing step of releasing the die from the curable resin after the hardening step, wherein a die releasing treatment is applied to the flange molding sections of the die and rise surfaces which connect with the flange molding sections and form the depressed sections, and in the dispensing steps, a dispensed volume of the curable resin which is dispensed to a space between the substrate and each of the plurality of sets of the lens molding section and the flange molding section of the die is greater than a volume of a space which is formed between the substrate and each of the plurality of sets of the lens molding section and the flange molding section of the die.

10. The production method of a molding die of claim 9, wherein in the dispensing steps, the curable resin is dispensed so as to form a tapered shape when the curable resin is hardened, where the tapered shape becomes wider toward a facing surface of the substrate, facing the die, and forms an angle from 30° to 40° with the facing surface.

11. The production method of a die of claim 9, further comprising a dicing step of dicing up the substrate at positions in the curable resin which has been hardened, where the positions correspond to the depressed sections of the die, wherein a width of the depressed section formed on the die is greater than a dicing width in the dicing step.

12. The production method of a die of claim 9, wherein in the dispensing steps, the curable resin is dispensed on the die.

13. The production method of a die of claim 12, wherein the die is arranged perpendicularly under the substrate.

* * * * *